US012720518B2

(12) United States Patent
Suh et al.

(10) Patent No.: US 12,720,518 B2
(45) Date of Patent: Aug. 25, 2026

(54) METHOD AND DEVICE FOR MANAGING BWP IN NON-TERRESTRIAL NETWORK

(71) Applicants: HYUNDAI MOTOR COMPANY, Seoul (KR); KIA CORPORATION, Seoul (KR); INHA UNIVERSITY RESEARCH AND BUSINESS FOUNDATION, Incheon (KR)

(72) Inventors: Young Kil Suh, Hwaseong-si (KR); Gene Back Hahn, Hwaseong-si (KR); Ui Hyun Hong, Hwaseong-si (KR); Duk Kyung Kim, Hwaseong-si (KR)

(73) Assignees: Hyundai Motor Company, Seoul (KR); Kia Corporation, Seoul (KR); INHA University Research and Business Foundation, Incheon (KR)

( * ) Notice: Subject to any disclaimer, the term of this patent is extended or adjusted under 35 U.S.C. 154(b) by 21 days.

(21) Appl. No.: 18/639,383

(22) Filed: Apr. 18, 2024

(65) Prior Publication Data

US 2024/0267903 A1 Aug. 8, 2024

Related U.S. Application Data

(63) Continuation-in-part of application No. PCT/KR2022/016289, filed on Oct. 24, 2022.

(30) Foreign Application Priority Data

Oct. 26, 2021 (KR) ........................ 10-2021-0143689
Oct. 21, 2022 (KR) ........................ 10-2022-0136700

(51) Int. Cl.

*H04W 72/0457* (2023.01)
*H04L 5/00* (2006.01)

(Continued)

(52) U.S. Cl.

CPC ....... *H04W 72/0457* (2023.01); *H04L 5/0053* (2013.01); *H04W 72/0446* (2013.01); *H04W 74/0833* (2013.01); *H04W 84/06* (2013.01)

(58) Field of Classification Search

CPC ... G01S 5/02524; G01S 5/0235; H04L 5/0048
See application file for complete search history.

(56) References Cited

U.S. PATENT DOCUMENTS

2016/0323800 A1* 11/2016 Ulupinar .............. H04B 7/1851
2019/0222290 A1 7/2019 Ly et al.

(Continued)

FOREIGN PATENT DOCUMENTS

KR 10-2020-0071004 A 6/2020
KR 10-2020-0112936 A 10/2020

(Continued)

OTHER PUBLICATIONS

International Search Report dated Feb. 3, 2023 cited in International Patent Application No. PCT/KR2022/016289 (w/English translation).

*Primary Examiner* — Jeffrey M Rutkowski
(74) *Attorney, Agent, or Firm* — Morgan Lewis & Bockius LLP

(57) ABSTRACT

In method and device for managing a BWP in a non-terrestrial network, the method of a terminal includes the steps of: receiving BWP switching setting information from a satellite; confirming a BWP switching combination indicated by the BWP switching setting information; performing a BWP switching operation according to a switching order determined by the BWP switching combination; and communicating with the satellite via the BWP switched according to the BWP switching operation.

18 Claims, 17 Drawing Sheets

(51) Int. Cl.

| | |
|---|---|
| ***H04W 72/0446*** | (2023.01) |
| ***H04W 74/0833*** | (2024.01) |
| *H04W 84/06* | (2009.01) |

(56) References Cited

U.S. PATENT DOCUMENTS

| | | | | |
|---|---|---|---|---|
| 2020/0052782 | A1 | 2/2020 | Wang et al. | |
| 2020/0127799 | A1 | 4/2020 | Orsino et al. | |
| 2020/0178135 | A1* | 6/2020 | Yun | H04W 36/0061 |
| 2022/0006599 | A1* | 1/2022 | Wang | H04W 52/0229 |
| 2022/0361187 | A1* | 11/2022 | Sengupta | H04W 72/121 |
| 2022/0361254 | A1* | 11/2022 | Ma | H04W 72/0446 |
| 2024/0015794 | A1* | 1/2024 | Ye | H04W 72/11 |
| 2024/0030964 | A1* | 1/2024 | Hou | H04W 72/1268 |
| 2024/0155652 | A1* | 5/2024 | Noh | H04W 72/27 |
| 2024/0259153 | A1* | 8/2024 | Su | H04W 72/0453 |
| 2025/0096959 | A1* | 3/2025 | Sakhnini | H04W 72/231 |
| 2026/0067869 | A1* | 3/2026 | Jiang | H04W 72/044 |

FOREIGN PATENT DOCUMENTS

| | | | |
|---|---|---|---|
| KR | 10-2020-0145683 | A | 12/2020 |
| KR | 10-2021-0040061 | A | 4/2021 |

* cited by examiner

FIG. 1A 140
data network
130
feeder link
110
service link
120
beam foot print

FIG. 1B

UE
NG-RAN or 6G-RAN
NR Uu or 6G Uu
satellite
gateway
RRU
base station
NG or 6G
core network
N6
data network

NG-RAN or 6G-RAN satellite (base station)

NG over SRI or 6G over SRI gateway

NG or 6G core network

N6 data network

FIG. 4A

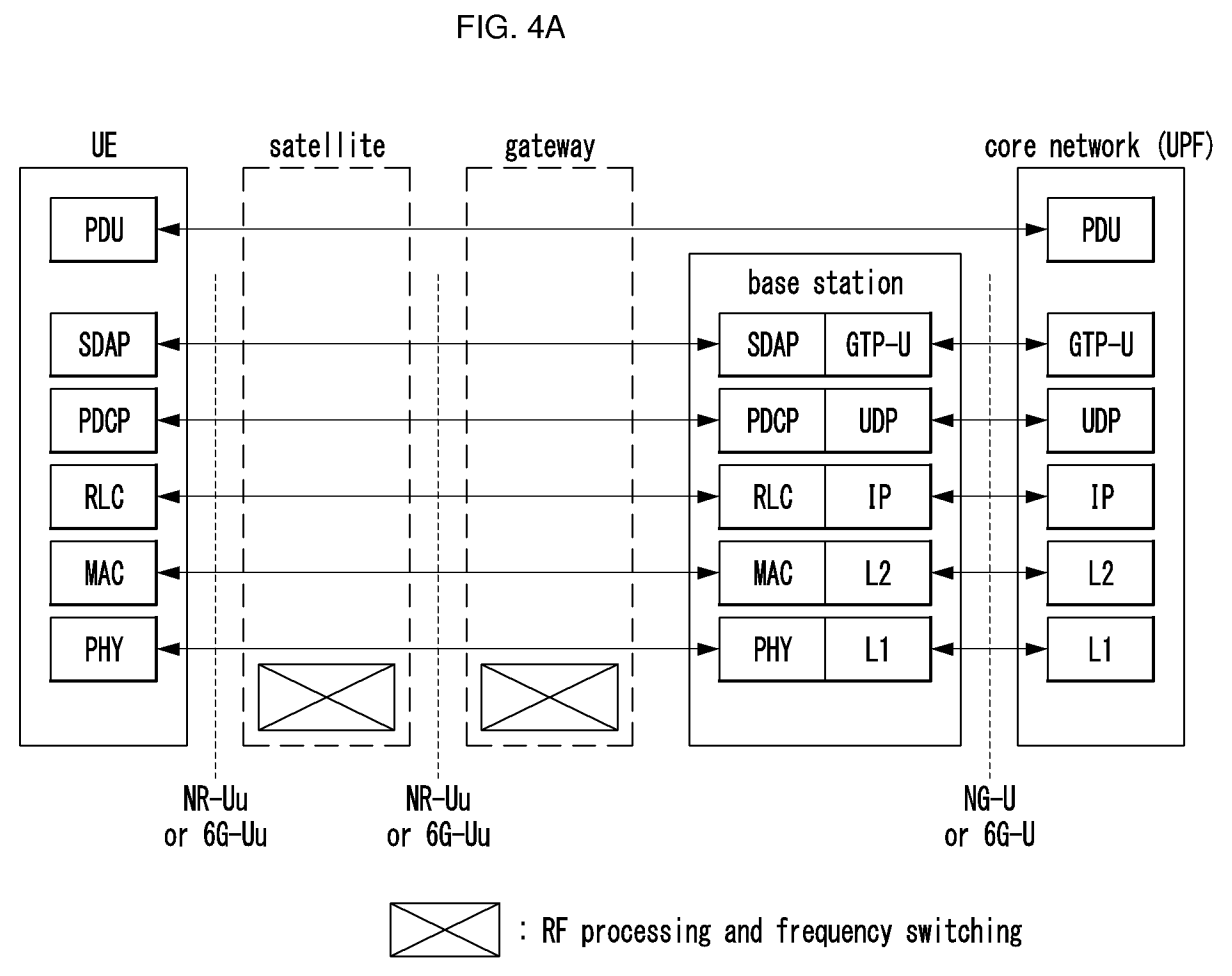

UE
PDU
SDAP
PDCP
RLC
MAC
PHY satellite gateway base station
SDAP
PDCP
RLC
MAC
PHY
GTP-U
UDP
IP
L2
L1 core network (UPF)
PDU
GTP-U
UDP
IP
L2
L1

NR-Uu or 6G-Uu
NR-Uu or 6G-Uu
NG-U or 6G-U

: RF processing and frequency switching

FIG. 4B

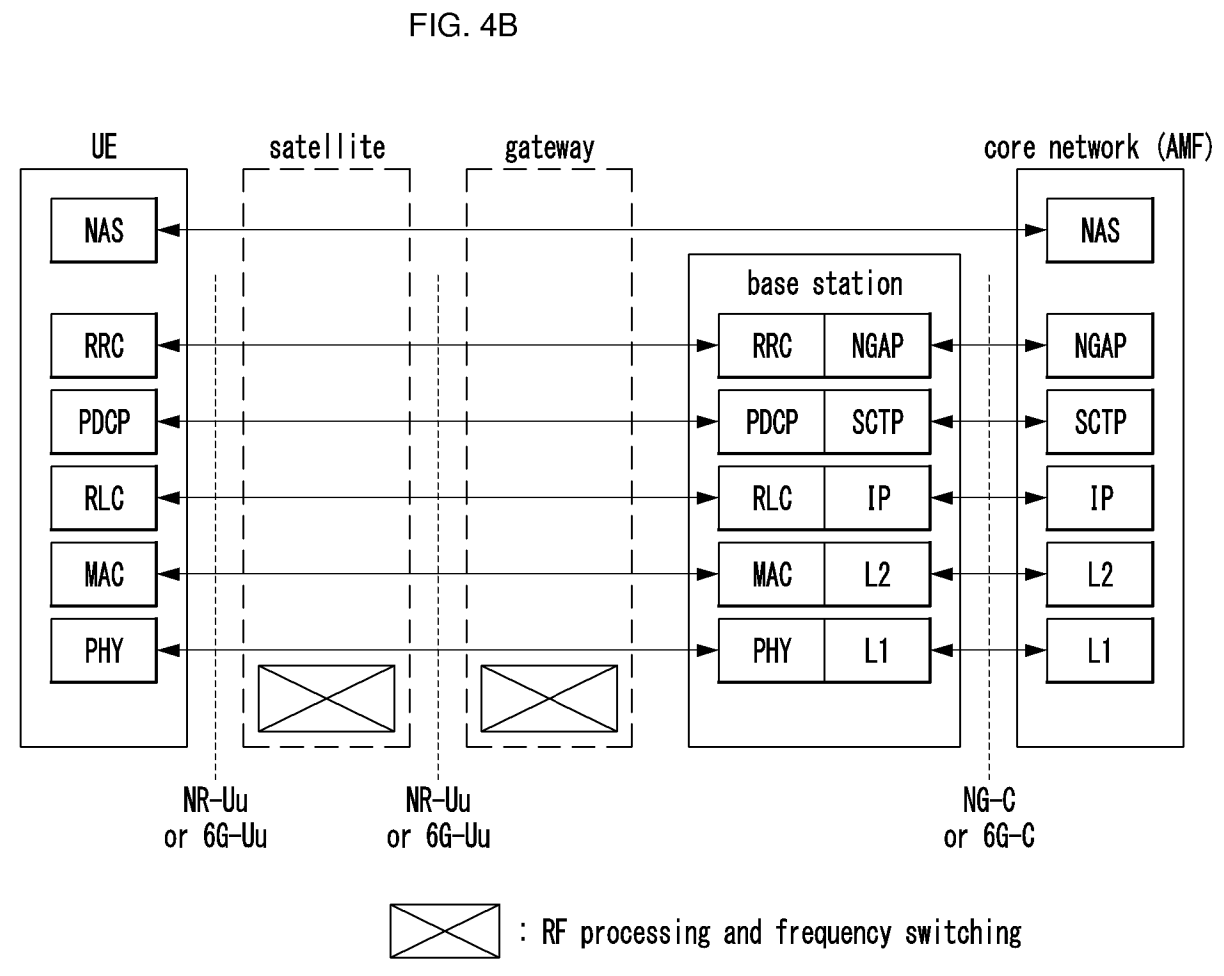

UE
NAS
RRC
PDCP
RLC
MAC
PHY satellite gateway base station
RRC
PDCP
RLC
MAC
PHY
NGAP
SCTP
IP
L2
L1 core network (AMF)
NAS
NGAP
SCTP
IP
L2
L1

NR-Uu or 6G-Uu

NR-Uu or 6G-Uu

NG-C or 6G-C

: RF processing and frequency switching

UE
satellite
base station
gateway
AMF
SMF
core network
NAS-SM
NAS-MM
RRC
PDCP
RLC
MAC
PHY
NR-Uu or 6G-Uu
NG-AP
SCTP
IP
Protocol Layers of the SRI
L2
L1
NG-C or 6G-C
NAS-SM relay
N11
N6

METHOD AND DEVICE FOR MANAGING BWP IN NON-TERRESTRIAL NETWORK

CROSS-REFERENCE TO RELATED APPLICATION

The present application is a continuation-in-part of currently pending International Patent Application No. PCT/KR2022/016289, filed Oct. 24, 2022, which claims priority to Korean Patent Application Number 10-2022-0136700, filed Oct. 21, 2022 and Korean Patent Application Number 10-2021-0143689, filed Oct. 26, 2021, the entire contents of which are incorporated herein for all purposes by these references.

BACKGROUND OF THE PRESENT DISCLOSURE

Field of the Present Disclosure

The present disclosure relates to a method for bandwidth part(s) (BWP(s)) in a non-terrestrial network, and more particularly, to a BWP switching technique based on BWP switching configuration.

Description of Related Art

In order to provide enhanced communication services, a communication system (e.g. 5G communication network, 6G communication network, etc.) using a higher frequency band (e.g. a frequency band of 6 GHz or above) than a frequency band (e.g. a frequency band of 6 GHz or below) of the Long Term Evolution (LTE) communication system (or, LTE-A communication system) is being considered. The 5G communication network (e.g. new radio (NR) communication network) may support not only a frequency band of 6 GHz or below, but also a frequency band of 6 GHz or above, and may support various communication services and scenarios compared to the LTE communication network. For example, usage scenarios of the 5G communication network may include enhanced Mobile BroadBand (eMBB), Ultra Reliable Low Latency Communication (URLLC), Massive Machine Type Communication (mMTC), and the like. In addition, in order to provide enhanced communication services compared to the 5G communication network, the 6G communication network may support various and wide frequency bands and may be applied to various usage scenarios (e.g. terrestrial communication, non-terrestrial communication, sidelink communication, and the like).

The communication network (e.g. 5G communication network, 6G communication network, etc.) may provide communication services to terminals located on the ground. Recently, the demand for communication services for not only terrestrial but also non-terrestrial airplanes, drones, and satellites has been increasing, and for this purpose, technologies for a non-terrestrial network (NTN) have been discussed. The non-terrestrial network may be implemented based on 5G communication technology, 6G communication technology, and/or the like. For example, in the non-terrestrial network, communication between a satellite and a terrestrial communication node or a non-terrestrial communication node (e.g. airplane, drone, or the like) may be performed based on 5G communication technology, 6G communication technology, and/or the like. In the NTN, the satellite may perform functions of a base station in a communication network (e.g. 5G communication network, 6G communication network, and/or the like).

Meanwhile, in the NTN (e.g. low earth orbit (LEO) satellite-based NTN), beam switching operations of satellites may occur frequently. Therefore, signaling overhead due to bandwidth part (BWP) switching may be large. A BWP switching method to solve the above-described problem is required.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

The present disclosure is directed to providing a method and an apparatus for BWP switching in a non-terrestrial network.

A method of a terminal, according to various exemplary embodiments of the present disclosure for achieving the above-described objective, may include: receiving bandwidth part (BWP) switching configuration information from a satellite; confirming a BWP switching combination indicated by the BWP switching configuration information; performing a BWP switching operation according to a switching order indicated by the BWP switching combination; and performing communication with the satellite in a BWP switched according to the BWP switching operation.

The BWP switching configuration information may include a BWP switching configuration table, each entry of the BWP switching configuration table may include an index, a BWP switching combination, and a time, and the time may indicate a usage time of a BWP according to the switching order.

The BWP switching configuration information may further include a specific index indicating a specific entry in the BWP switching configuration table.

The BWP switching configuration table may be received from the satellite through a first signaling message, and the specific index may be received from the satellite through a second signaling message.

The method may further include: receiving, from the satellite, start time information of the BWP switching operation, wherein the BWP switching operation starts at a time indicated by the start time information.

The start time information may be a slot offset between a slot where the start time information is received and a slot where the BWP switching operation starts.

The method may further include: transmitting, to the satellite, acknowledgement (ACK) indicating that the BWP switching configuration information is confirmed.

The method may further include: receiving a BWP offset from the satellite, wherein the BWP switching operation is performed for a BWP after the BWP offset from a first BWP according to the switching order.

The BWP switching configuration information may be received in a handover procedure for the satellite.

The method may further include: when a first operating BWP of the terminal is different from a second operating BWP of the satellite, switching the first operating BWP to a default BWP or previous BWP.

The method may further include: transmitting, to the satellite, auxiliary information considered for generating the BWP switching configuration information, wherein the auxiliary information is transmitted in a random access (RA) procedure between the terminal and the satellite, or transmitted after completion of the RA procedure.

A method of a satellite, according to various exemplary embodiments of the present disclosure for achieving the above-described objective, may include: generating bandwidth part (BWP) switching configuration information indicating a BWP switching combination; transmitting the BWP switching configuration information to a terminal; performing a BWP switching operation according to a switching order indicated by the BWP switching combination; and performing communication with the terminal in a BWP switched according to the BWP switching operation.

The BWP switching configuration information may include a BWP switching configuration table, each entry of the BWP switching configuration table may include an index, a BWP switching combination, and a time, and the time may indicate a usage time of a BWP according to the switching order.

The BWP switching configuration information may further include a specific index indicating a specific entry in the BWP switching configuration table.

The BWP switching configuration table may be transmitted to the terminal through a first signaling message, and the specific index may be transmitted to the terminal through a second signaling message.

The method may further include: transmitting, to the terminal, start time information of the BWP switching operation, wherein the BWP switching operation starts at a time indicated by the start time information.

The start time information may be a slot offset between a slot where the start time information is received and a slot where the BWP switching operation starts.

The method may further include: transmitting a BWP offset to the terminal, wherein the BWP switching operation is performed for a BWP after the BWP offset from a first BWP according to the switching order.

The method may further include: when a first operating BWP of the terminal is different from a second operating BWP of the satellite, switching the second operating BWP to a default BWP or previous BWP.

The method may further include: receiving, from the terminal, auxiliary information considered for generating the BWP switching configuration information, wherein the auxiliary information is received in a random access (RA) procedure between the terminal and the satellite, or received after completion of the RA procedure.

According to an exemplary embodiment of the present disclosure, a satellite can configure BWP switching, and transmit BWP switching configuration information to a terminal. The satellite and the terminal can switch BWPs according to a switching order indicated by the BWP switching configuration information, and perform communication in the switched BWP. Since the BWP switching is configured in advance between the satellite and the terminal, signaling overhead for the BWP switching can be reduced and performance of the communication system can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A is a conceptual diagram illustrating various exemplary embodiments of a non-terrestrial network.

FIG. 1B is a conceptual diagram illustrating various exemplary embodiments of a non-terrestrial network.

FIG. 2B is a conceptual diagram illustrating various exemplary embodiments of a non-terrestrial network.

FIG. 4A is a conceptual diagram illustrating various exemplary embodiments of a protocol stack of a user plane in a transparent payload-based non-terrestrial network.

FIG. 4B is a conceptual diagram illustrating various exemplary embodiments of a protocol stack of a control plane in a transparent payload-based non-terrestrial network.

Figure 2A:
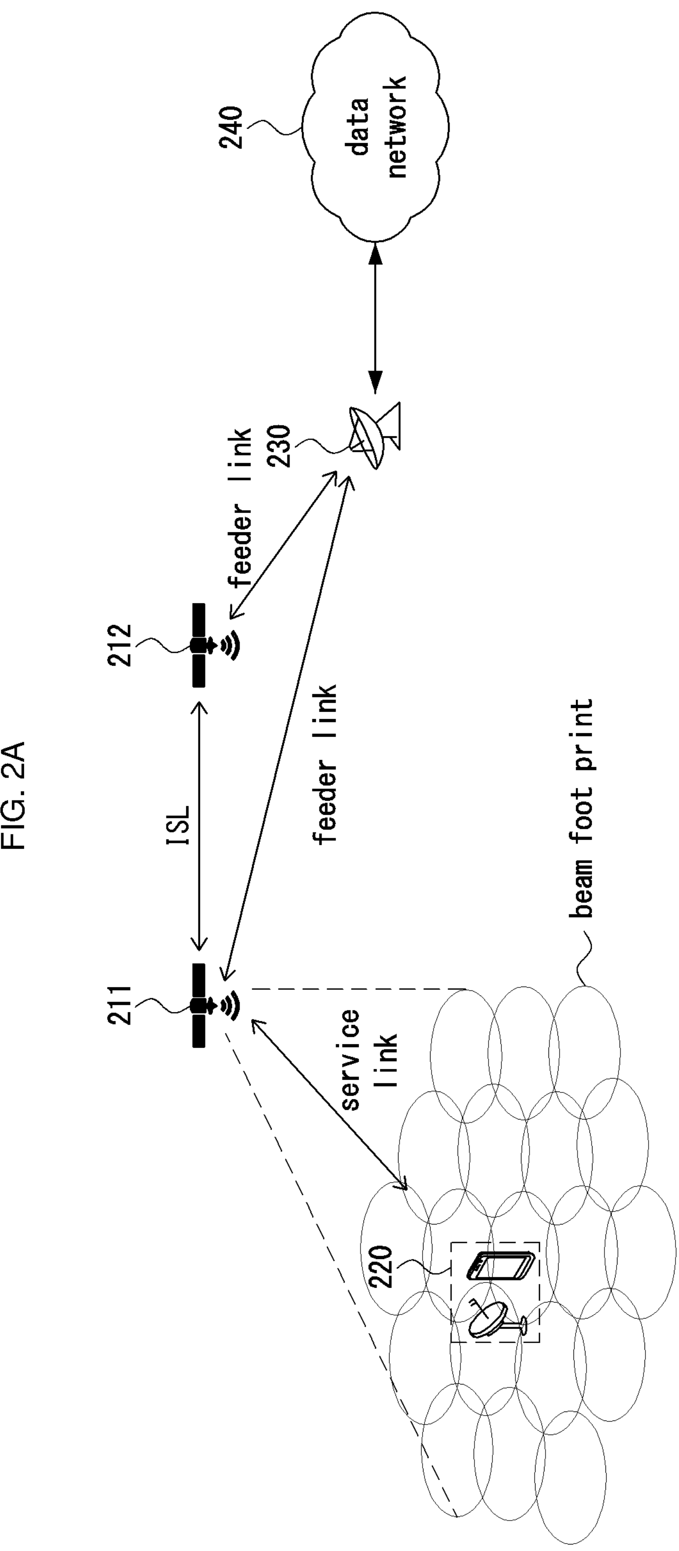
FIG. 2A is a conceptual diagram illustrating various exemplary embodiments of a non-terrestrial network.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

In exemplary embodiments of the present disclosure, "(re)transmission" may refer to "transmission", "retransmission", or "transmission and retransmission", "(re)configuration" may refer to "configuration", "reconfiguration", or "configuration and reconfiguration", "(re)connection" may refer to "connection", "reconnection", or "connection and reconnection", "(re)access" may mean "access", "re-access", or "access and re-access", and "(re)selection" may mean "selection", "reselection", or "selection and reselection".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprise" and/or "include" when used herein, specify the presence of stated features, integers, steps, operations, elements, components or combinations thereof, but do not preclude the presence or addition of one or more other features, integers, steps, operations, elements, components, and/or combinations thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted. In addition to the exemplary embodiments explicitly described in the present disclosure, operations may be performed according to a combination of the exemplary embodiments of the present disclosure, extensions of the exemplary embodiments of the present disclosure, and/or modifications of the exemplary embodiments. Performance of some operations may be omitted, and the order of performance of operations may be changed.

Even when a method (e.g. transmission or reception of a signal) performed at a first communication node among communication nodes is described, a corresponding second communication node may perform a method (e.g. reception or transmission of the signal) corresponding to the method performed at the first communication node. That is, when an operation of a user equipment (UE) is described, a base station corresponding to the UE may perform an operation corresponding to the operation of the UE. Conversely, when an operation of a base station is described, a UE corresponding to the base station may perform an operation corresponding to the operation of the base station. In a non-terrestrial network (NTN) (e.g. payload-based NTN), operations of a base station may refer to operations of a satellite, and operations of a satellite may refer to operations of a base station.

The base station may refer to a NodeB, evolved NodeB (eNodeB), next generation node B (gNodeB), gNB, device, apparatus, node, communication node, base transceiver station (BTS), radio remote head (RRH), transmission reception point (TRP), radio unit (RU), road side unit (RSU), radio transceiver, access point, access node, and/or the like. The UE may refer to a terminal, device, apparatus, node, communication node, end node, access terminal, mobile terminal, station, subscriber station, mobile station, portable subscriber station, on-broad unit (OBU), and/or the like.

In exemplary embodiments of the present disclosure, signaling may be at least one of higher layer signaling, medium access control (MAC) signaling, or physical (PHY) signaling. Messages used for higher layer signaling may be referred to as 'higher layer messages' or 'higher layer signaling messages'. Messages used for MAC signaling may be referred to as 'MAC messages' or 'MAC signaling messages'. Messages used for PHY signaling may be referred to as 'PHY messages' or 'PHY signaling messages'. The higher layer signaling may refer to a transmission and reception operation of system information (e.g. master information block (MIB), system information block (SIB)) and/or RRC messages. The MAC signaling may refer to a transmission and reception operation of a MAC control element (CE). The PHY signaling may refer to a transmission and reception operation of control information (e.g. downlink control information (DCI), uplink control information (UCI), and sidelink control information (SCI)).

In exemplary embodiments of the present disclosure, "an operation (e.g. transmission operation) is configured" may mean that "configuration information (e.g. information element(s) or parameter(s)) for the operation and/or information indicating to perform the operation is signaled". "Information element(s) (e.g. parameter(s)) are configured" may mean that "corresponding information element(s) are signaled".

A communication system may include at least one of a terrestrial network, non-terrestrial network, 4G communication network (e.g. long-term evolution (LTE) communication network), 5G communication network (e.g. new radio (NR) communication network), or 6G communication network. Each of the 4G communications network, 5G communications network, and 6G communications network may include a terrestrial network and/or a non-terrestrial network. The non-terrestrial network may operate based on at least one communication technology among the LTE communication technology, 5G communication technology, or 6G communication technology. The non-terrestrial network may provide communication services in various frequency bands.

The communication network to which exemplary embodiments are applied is not limited to the content described below, and the exemplary embodiments may be applied to various communication networks (e.g. 4G communication network, 5G communication network, and/or 6G communication network). Here, a communication network may be used in the same sense as a communication system.

Figure 1A:
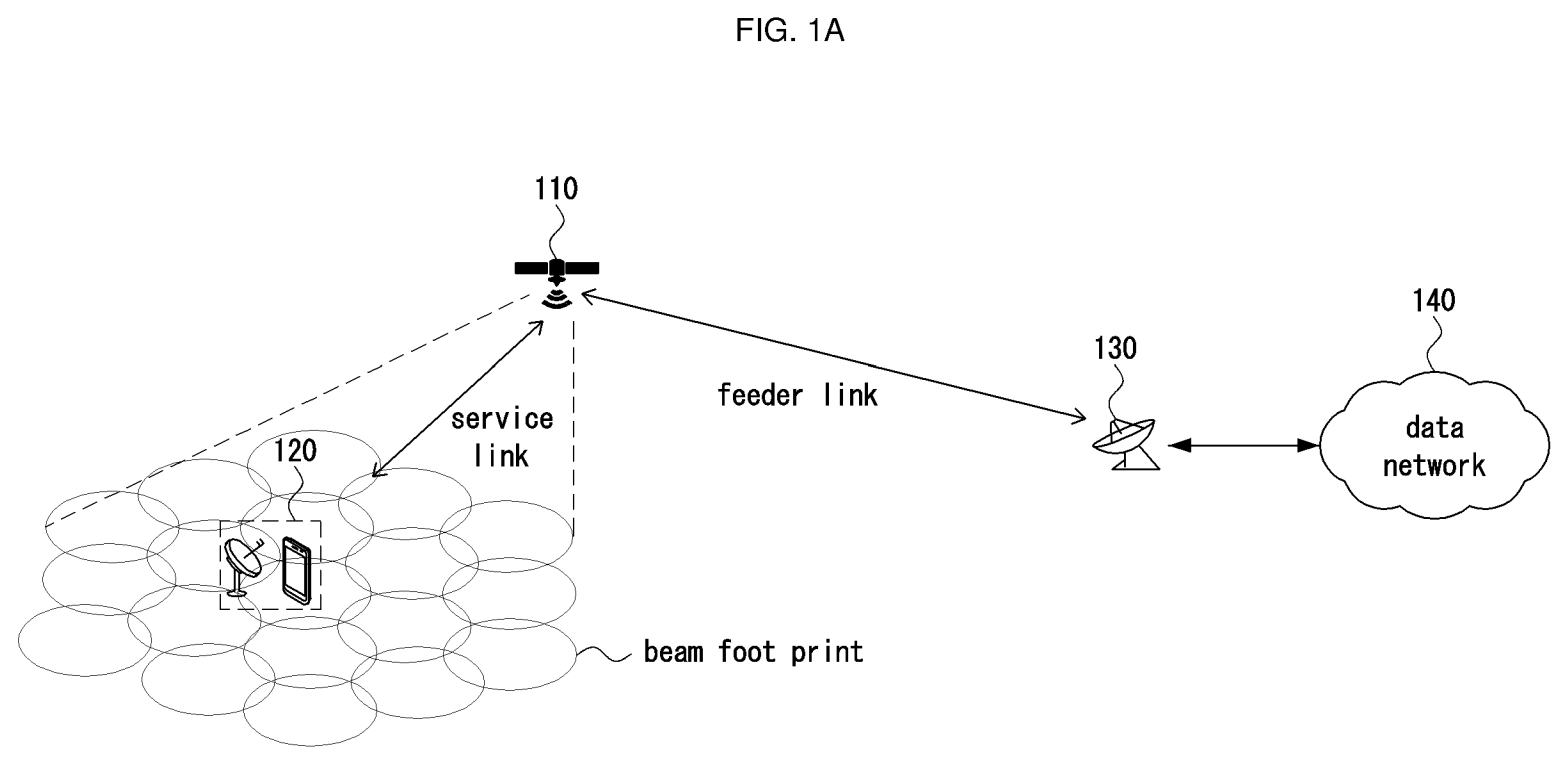

FIG. 1A is a conceptual diagram illustrating a first exemplary embodiment of a non-terrestrial network.

As shown in FIG. 1A, a non-terrestrial network (NTN) may include a satellite 110, a communication node 120, a gateway 130, a data network 140, and the like. A unit including the satellite 110 and the gateway 130 may correspond to a remote radio unit (RRU). The NTN shown in FIG. 1A may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS). A non-GEO satellite may be an LEO satellite and/or MEO satellite.

The communication node 120 may include a communication node (e.g. a user equipment (UE) or a terminal) located on a terrestrial site and a communication node (e.g. an airplane, a drone) located on a non-terrestrial space. A service link may be established between the satellite 110 and the communication node 120, and the service link may be a radio link. The satellite 110 may provide communication services to the communication node 120 using one or more beams. The shape of a footprint of the beam of the satellite 110 may be elliptical or circular.

The communication node 120 may perform communications (e.g. downlink communication and uplink communication) with the satellite 110 using 4G communication technology, 5G communication technology, and/or 6G communication technology. The communications between the satellite 110 and the communication node 120 may be performed using an NR-Uu interface and/or 6G-Uu interface. When dual connectivity (DC) is supported, the communication node 120 may be connected to other base stations (e.g. base stations supporting 4G, 5G, and/or 6G functionality) as well as the satellite 110, and perform DC operations based on the techniques defined in 4G, 5G, and/or 6G technical specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface, a 6G-Uu interface, or a satellite radio interface (SRI). The gateway 130 may be connected to the data network 140. There may be a 'core network' between the gateway 130 and the data network 140. In the instant case, the gateway 130 may be connected to the core network, and the core network may be connected to the data network 140. The core network may support the 4G communication technology, 5G communication technology, and/or 6G communication technology. For example, the core network may include an access and mobility management function (AMF), a user plane function (UPF), a session management function (SMF), and the like. The communications between the gateway 130 and the core network may be performed based on an NG-C/U interface or 6G-C/U interface.

Figure 1B:
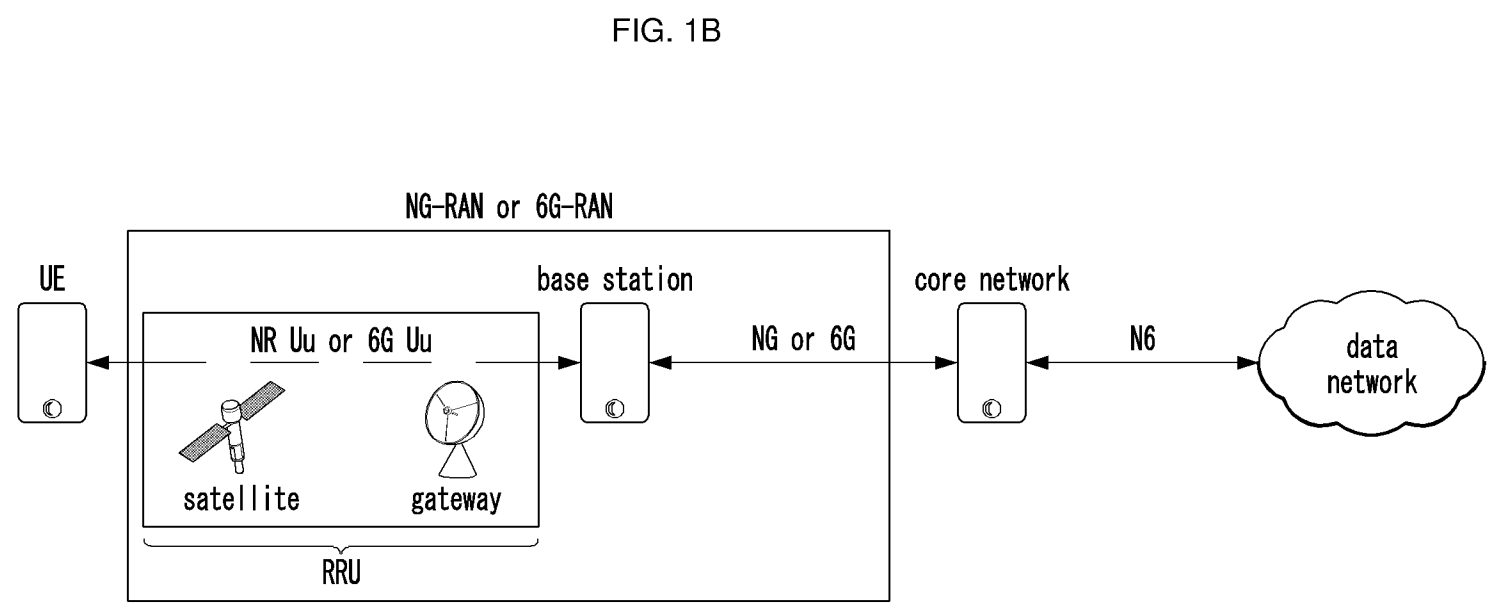

As shown in an exemplary embodiment of FIG. 1B, there may be a 'core network' between the gateway 130 and the data network 140 in a transparent payload-based NTN.

FIG. 1B is a conceptual diagram illustrating a second exemplary embodiment of a non-terrestrial network.

As shown in FIG. 1B, the gateway may be connected with the base station, the base station may be connected with the core network, and the core network may be connected with the data network. Each of the base station and core network may support the 4G communication technology, 5G communication technology, and/or 6G communication technology. The communications between the gateway and the base station may be performed based on an NR-Uu interface or 6G-Uu interface, and the communications between the base station and the core network (e.g. AMF, UPF, SMF, and the like) may be performed based on an NG-C/U interface or 6G-C/U interface.

FIG. 2A is a conceptual diagram illustrating a third exemplary embodiment of a non-terrestrial network.

As shown in FIG. 2A, a non-terrestrial network may include a first satellite 211, a second satellite 212, a communication node 220, a gateway 230, a data network 240, and the like. The NTN shown in FIG. 2A may be a regenerative payload based NTN. For example, each of the satellites 211 and 212 may perform a regenerative operation (e.g. demodulation, decoding, re-encoding, re-modulation, and/or filtering operation) on a payload received from other entities (e.g. the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g. UE or terminal) and a non-terrestrial communication node (e.g. airplane or drone). A service link (e.g. radio link) may be established between the satellite 211 and communication node 220. The satellite 211 may provide communication services to the communication node 220 using one or more beams.

The communication node 220 may perform communications (e.g. downlink communication or uplink communication) with the satellite 211 using the 4G communication technology, 5G communication technology, and/or 6G communication technology. The communications between the satellite 211 and the communication node 220 may be performed using an NR-Uu interface or 6G-Uu interface. When DC is supported, the communication node 220 may be connected to other base stations (e.g. base stations supporting 4G, 5G, and/or 6G functionality) as well as the satellite 211, and may perform DC operations based on the techniques defined in 4G, 5G, and/or 6G technical specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily. The communications between each of the satellites 211 and 212 and the gateway 230 may be performed based on an NR-Uu interface, a 6G-Uu interface, or an SRI. The gateway 230 may be connected to the data network 240.

Figure 2B:
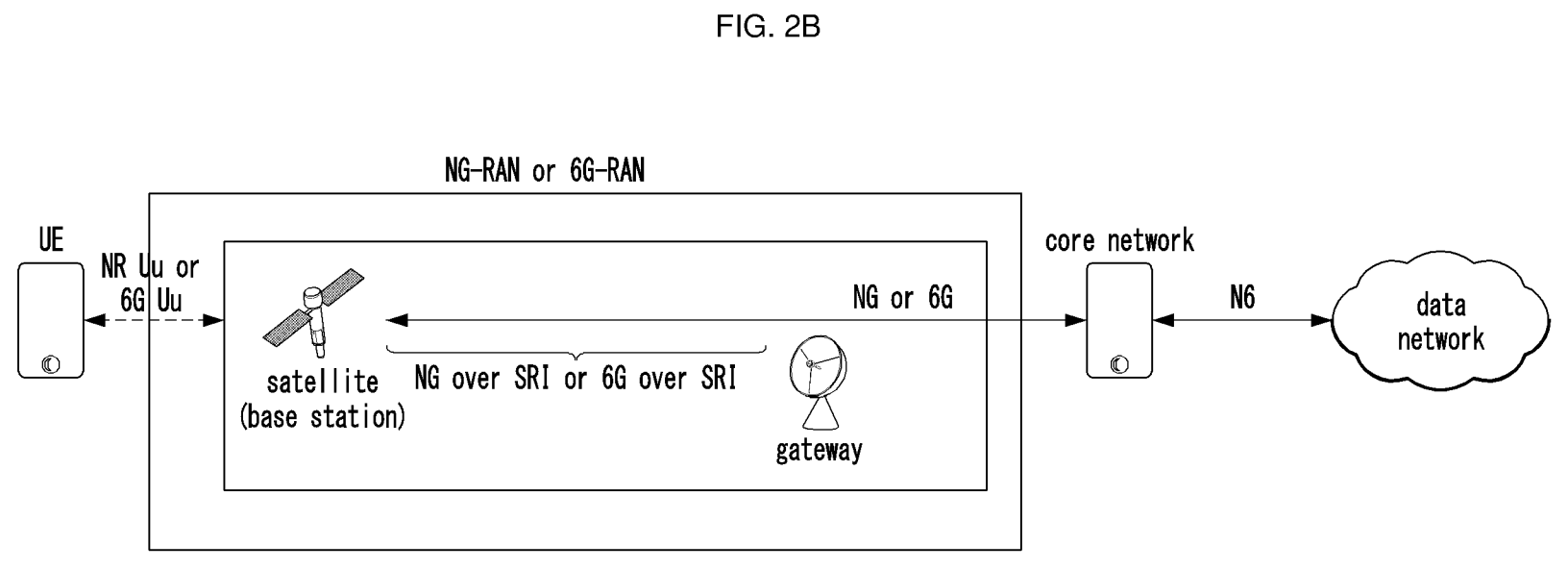
Figure 2C:
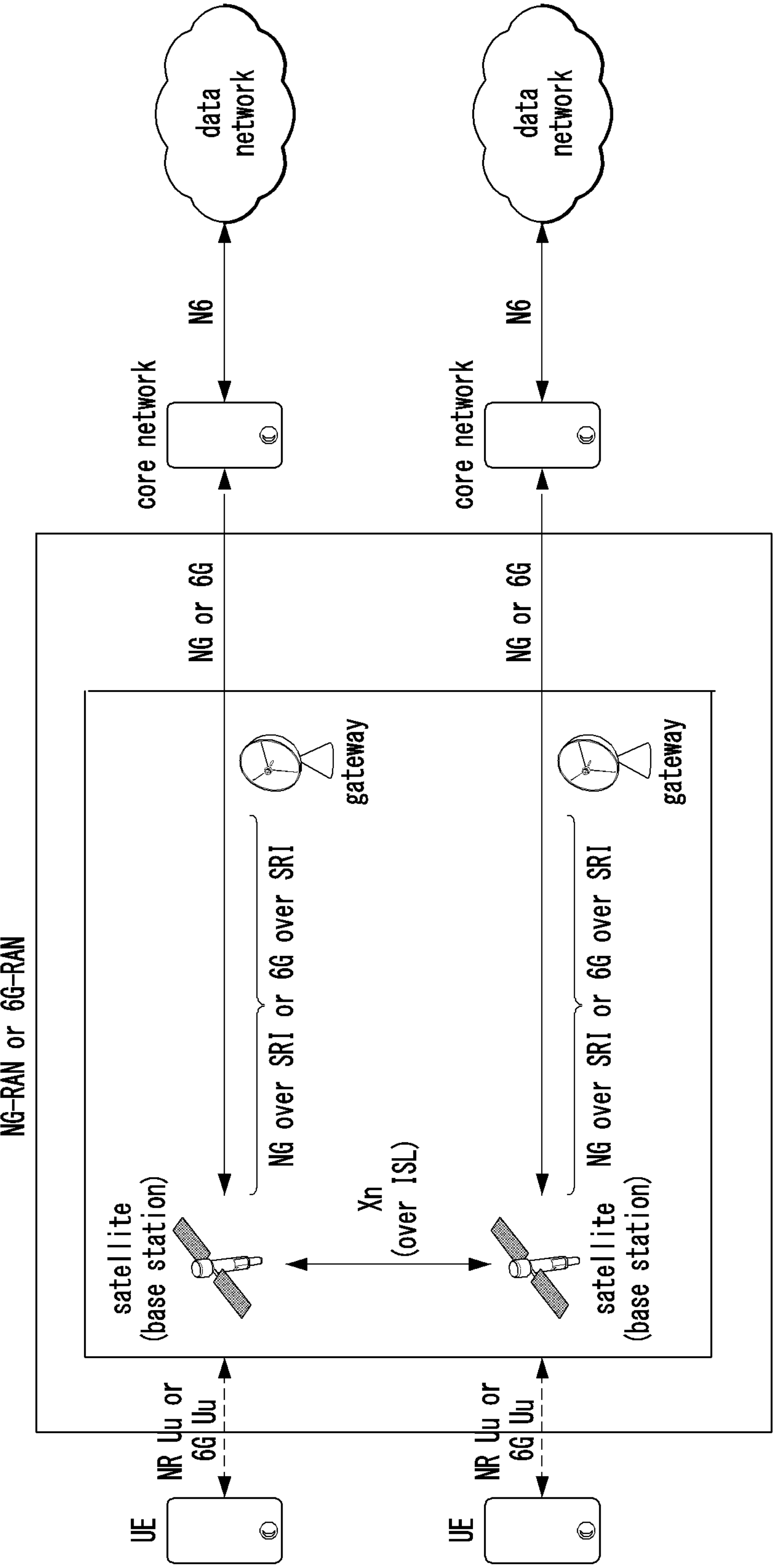
FIG. 2C is a conceptual diagram illustrating various exemplary embodiments of a non-terrestrial network.

As shown in exemplary embodiments of FIG. 2B and FIG. 2C, there may be a 'core network' between the gateway 230 and the data network 240.

FIG. 2B is a conceptual diagram illustrating a fourth exemplary embodiment of a non-terrestrial network, and FIG. 2C is a conceptual diagram illustrating a fifth exemplary embodiment of a non-terrestrial network.

As shown in FIG. 2B and FIG. 2C, the gateway may be connected with the core network, and the core network may be connected with the data network. The core network may support the 4G communication technology, 5G communication technology, and/or 6G communication technology. For example, the core network may include AMF, UPF, SMF, and the like. Communication between the gateway and the core network may be performed based on an NG-C/U interface or 6G-C/U interface. Functions of a base station may be performed by the satellite. That is, the base station may be located on the satellite. A payload may be processed by the base station located on the satellite. Base stations located on different satellites may be connected to the same core network. One satellite may have one or more base stations. In the non-terrestrial network of FIG. 2B, an ISL between satellites may not be established, and in the non-terrestrial network of FIG. 2C, an ISL between satellites may be established.

Meanwhile, the entities (e.g. satellite, base station, UE, communication node, gateway, and the like) constituting the non-terrestrial network shown in FIGS. 1A, 1B, 2A, 2B, and/or 2C may be configured as follows.

Figure 3:
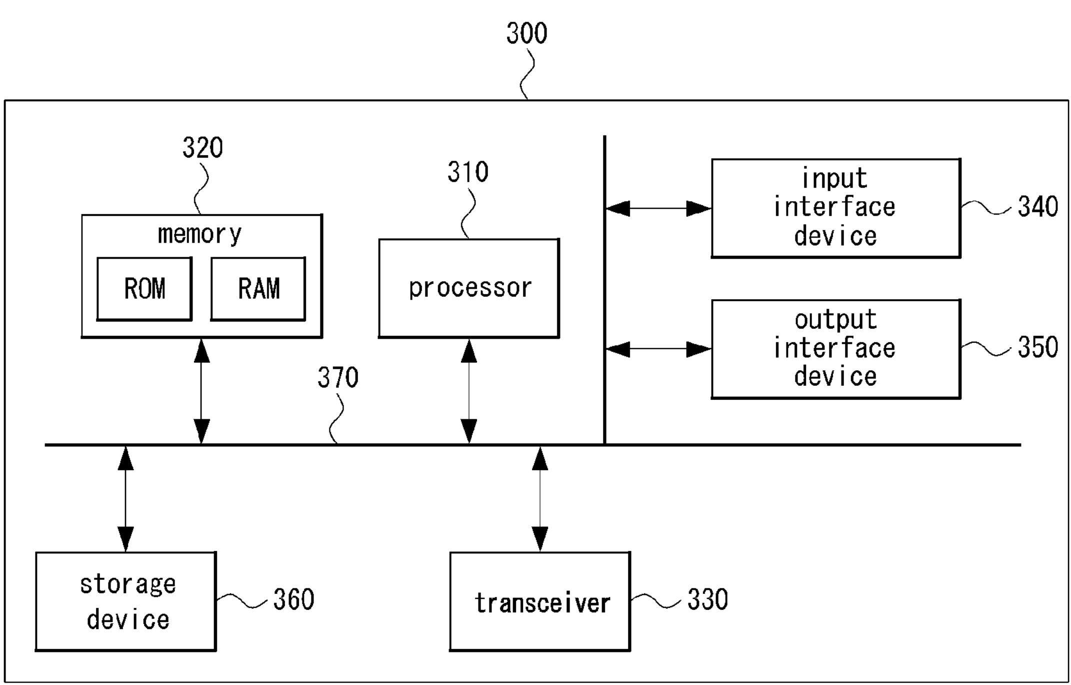
FIG. 3 is a block diagram illustrating various exemplary embodiments of an entity constituting a non-terrestrial network.

FIG. 3 is a block diagram illustrating a first exemplary embodiment of an entity constituting a non-terrestrial network.

As shown in FIG. 3, an entity 300 may include at least one processor 310, a memory 320, and a transceiver 330 connected to a network to perform communication. In addition, the entity 300 may further include an input interface device 340, an output interface device 350, a storage device 360, and the like. The components included in the entity 300 may be connected by a bus 370 to communicate with each other.

However, each component included in the entity 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present disclosure are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

Meanwhile, NTN reference scenarios may be defined as shown in Table 1 below.

TABLE 1

| | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1A and/or FIG. 1B is a GEO satellite (e.g. a GEO satellite that supports a transparent function), this may be referred to as 'scenario A'. When the satellites 211 and 212 in the NTN shown in FIG. 2A, FIG. 2B, and/or FIG. 2C are GEO satellites (e.g. GEOs that support a regenerative function), this may be referred to as 'scenario B'.

When the satellite 110 in the NTN shown in FIG. 1A and/or FIG. 1B is an LEO satellite with steerable beams, this may be referred to as 'scenario C1'. When the satellite 110 in the NTN shown in FIG. 1A and/or FIG. 1B is an LEO satellite having beams moving with the satellite, this may be referred to as 'scenario C2'. When the satellites 211 and 212 in the NTN shown in FIG. 2A, FIG. 2B, and/or FIG. 2C are LEO satellites with steerable beams, this may be referred to as 'scenario D1'. When the satellites 211 and 212 in the NTN shown in FIG. 2A, FIG. 2B, and/or FIG. 2C are LEO satellites having beams moving with the satellites, this may be referred to as 'scenario D2'. Parameters for the scenarios defined in Table 1 may be defined as shown in Table 2 below.

Parameters for the NTN reference scenarios defined in Table 1 may be defined as shown in Table 2 below.

TABLE 2

| | Scenarios A and B | Scenarios C and D |
|---|---|---|
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Maximum channel bandwidth capability (service link) | 30 MHz for band <6 GHz<br>1 GHz for band >6 GHz | |

TABLE 2-continued

| | Scenarios A and B | Scenarios C and D |
|---|---|---|
| Maximum distance between satellite and communication node (e.g. UE) at the minimum elevation angle | 40,581 km | 1,932 km (altitude of 600 km)<br>3,131 km (altitude of 1,200 km) |
| Maximum round trip delay (RTD) (only propagation delay) | Scenario A: 541.46 ms (service and feeder links)<br>Scenario B: 270.73 ms (only service link) | Scenario C: (transparent payload: service and feeder links)<br>−5.77 ms (altitude of 600 km)<br>−41.77 ms (altitude of 1,200 km)<br>Scenario D: (regenerative payload: only service link)<br>−12.89 ms (altitude of 600 km)<br>−20.89 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

| | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

FIG. 4A is a conceptual diagram illustrating a first exemplary embodiment of a protocol stack of a user plane in a transparent payload-based non-terrestrial network, and FIG. 4B is a conceptual diagram illustrating a first exemplary embodiment of a protocol stack of a control plane in a transparent payload-based non-terrestrial network.

As shown in FIGS. 4A and 4B, user data may be transmitted and received between a UE and a core network (e.g. UPF), and control data (e.g. control information) may be transmitted and received between the UE and the core network (e.g. AMF). Each of the user data the and control data may be transmitted and received through a satellite and/or gateway. The protocol stack of the user plane shown in FIG. 4A may be applied identically or similarly to a 6G communication network. The protocol stack of the control plane shown in FIG. 4B may be applied identically or similarly to a 6G communication network.

Figure 5A:
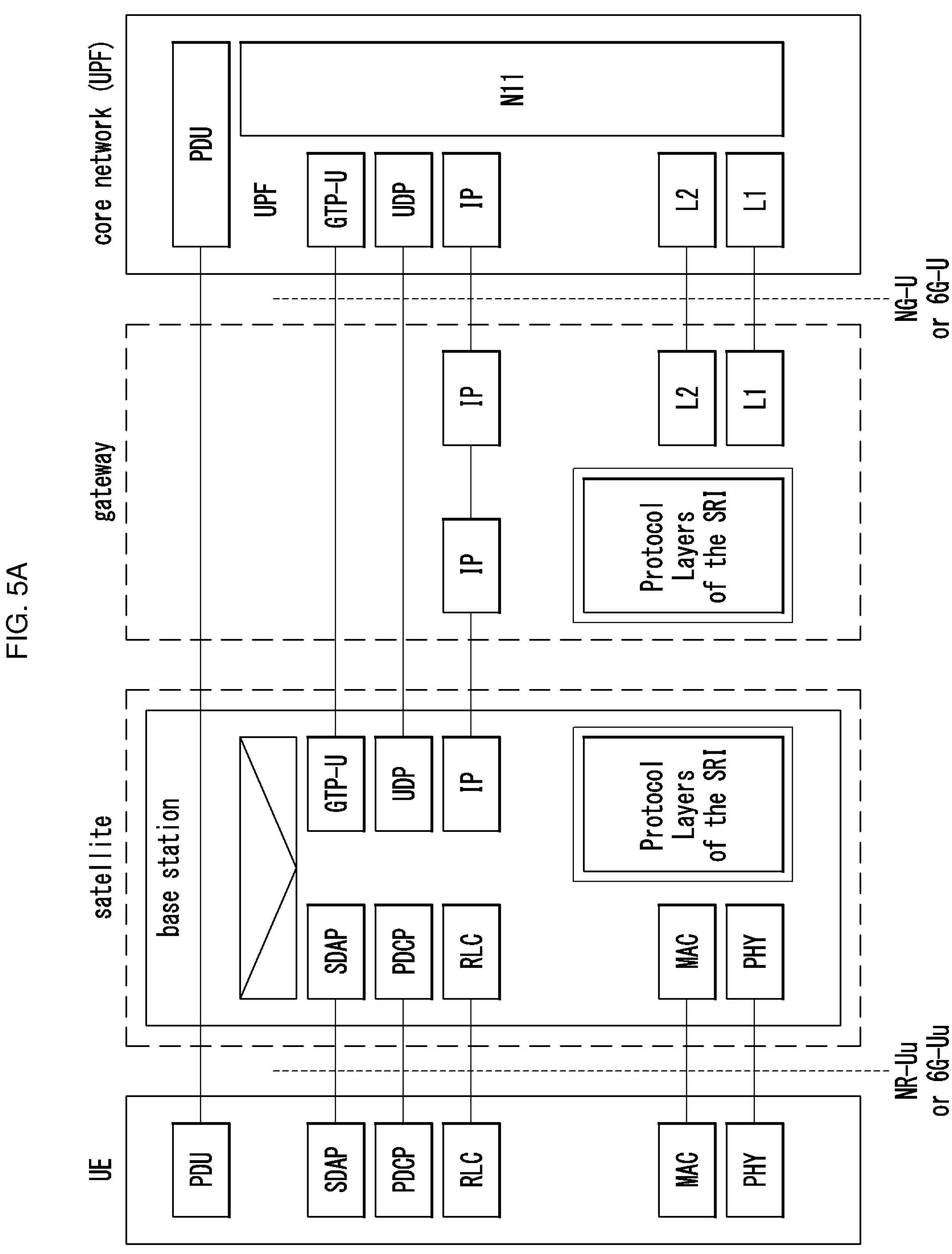
FIG. 5A is a conceptual diagram illustrating various exemplary embodiments of a protocol stack of a user plane in a regenerative payload-based non-terrestrial network.
Figure 5B:
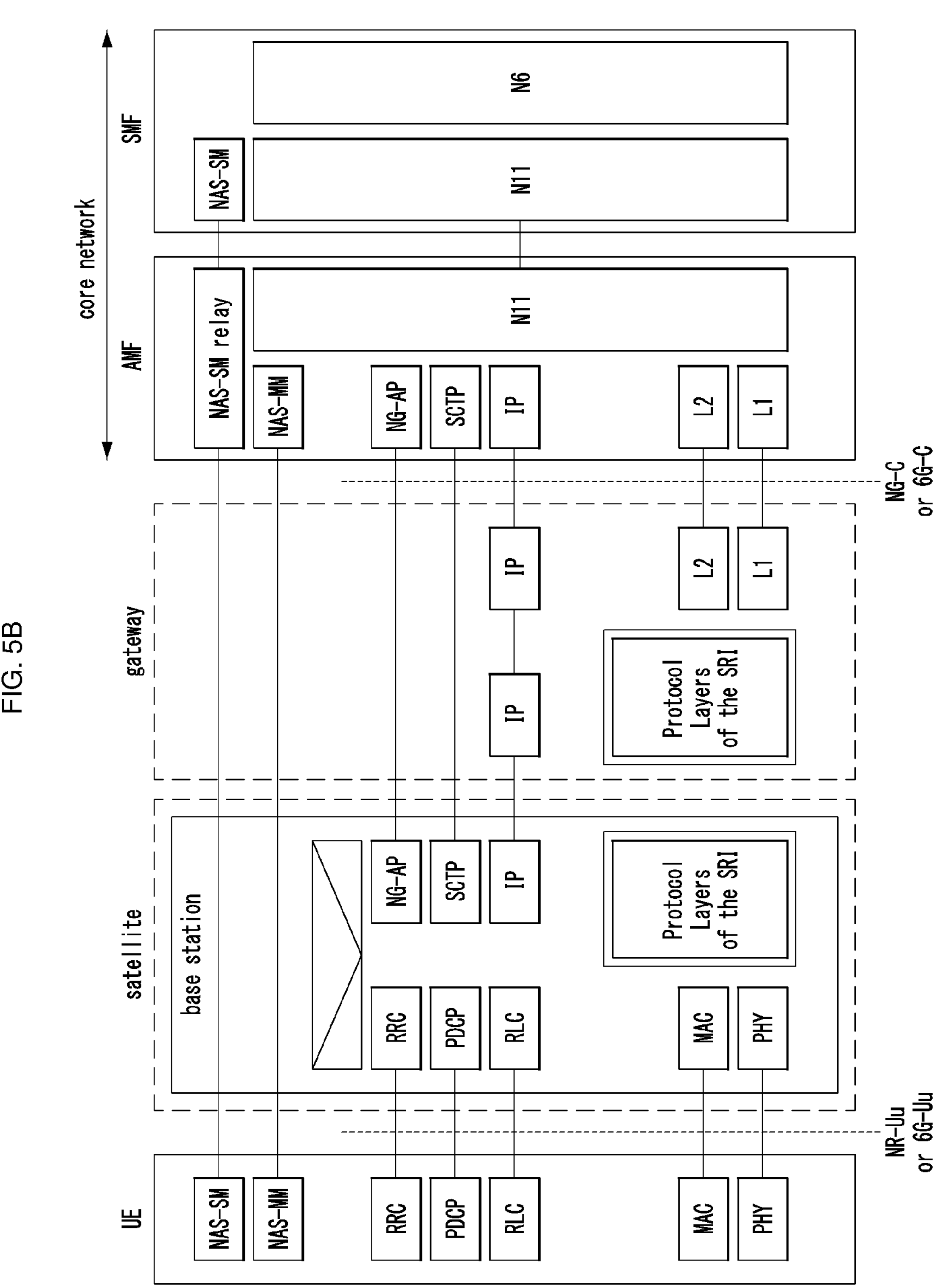
FIG. 5B is a conceptual diagram illustrating various exemplary embodiments of a protocol stack of a control plane in a regenerative payload-based non-terrestrial network.

FIG. 5A is a conceptual diagram illustrating a first exemplary embodiment of a protocol stack of a user plane in a regenerative payload-based non-terrestrial network, and FIG. 5B is a conceptual diagram illustrating a first exemplary embodiment of a protocol stack of a control plane in a regenerative payload-based non-terrestrial network.

As shown in FIGS. 5A and 5B, each of user data and control data (e.g. control information) may be transmitted and received through an interface between a UE and a satellite (e.g. base station). The user data may refer to a user protocol data unit (PDU). A protocol stack of a satellite radio interface (SRI) may be used to transmit and receive the user data and/or control data between the satellite and a gateway. The user data may be transmitted and received through a general packet radio service (GPRS) tunneling protocol (GTP)-U tunnel between the satellite and a core network.

In LEO-based NTN, beam switching operations of satellites may occur frequently. Therefore, signaling overhead due to bandwidth part (BWP) switching may be large. Unlike a terrestrial network (TN), movements of satellites in NTN may be predictable. In addition, a communication node may know in advance a distance between a satellite and a terminal, elevation angle, altitude, channel characteristics, and/or service environment (e.g. downtown, outskirts) according to movement of the satellite. BWP switching may be configured in advance based on the above-described information. Operational schemes based on BWP switching configuration may be required. In particular, methods for configuring BWP switching, methods for indicating BWP switching configuration, methods for determining a BWP switching time, methods for confirming BWP switching, and/or methods for responding to a BWP switching failure may be required.

[BWP Configuration]

Figure 6:
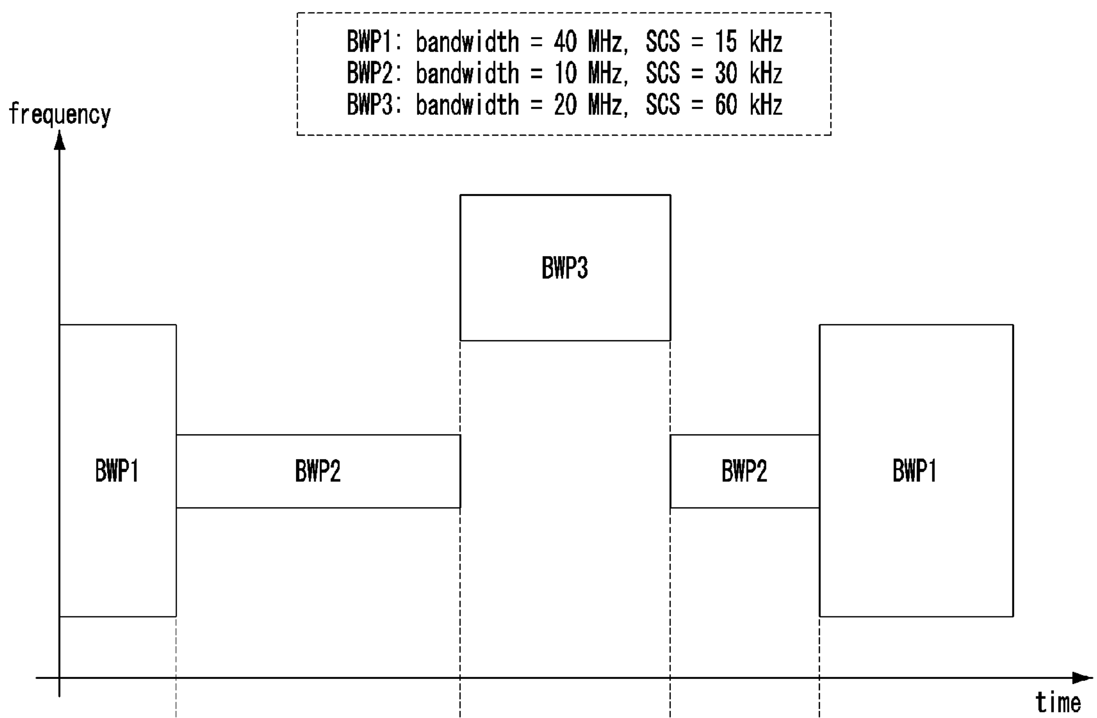
FIG. 6 is a conceptual diagram illustrating various exemplary embodiments of BWP configuration.

FIG. 6 is a conceptual diagram illustrating a first exemplary embodiment of BWP configuration.

As shown in FIG. 6, a BWP1, BWP2, and BWP3 may be configured. The bandwidths of BWPs may be set differently. The subcarrier spacings (SCSs) of BWPs may be set differently. The positions of BWPs in the frequency domain may be set differently. The times of configuring BWPs in the time domain may be set differently.

The base station may transmit BWP configuration information to the terminal using higher layer signaling (e.g. RRC signaling). For example, a higher layer signaling message may include serving cell configuration information (e.g. ServingCellConfig), and the serving cell configuration information may include a downlink BWP list (e.g. downlinkBWP-ToAddModList) and an uplink BWP list (e.g. uplinkBWP-ToAddModList). Each of the downlink BWP list and uplink BWP list may include BWP configuration information (e.g. BWP-Downlink, BWP-Uplink). The BWP configuration information may include at least one of BWP-Id, BWP-Common, or BWP-Dedicated. BWP-Id may have one value from 0 to 4. BWP-Common may be classified into BWP-DownlinkCommon and BWP-UplinkCommon. BWP-Common may include cell-specific parameters. For example, BWP-Common may include at least one of locationAndBandwidth, subcarrierSpacing, or cyclicPrefix. BWP-Dedicated may include UE-specific parameters. BWP inactivity timer (i.e. bwp-Inactivity Timer) may be set to one of {2 millisecond (ms), 3 ms, 4 ms, 5 ms, 6 ms, 8 ms, 10 ms, 20 ms, 30 ms, 40 ms, 50 ms, 60 ms, 80 ms, 100 ms, 200 ms, 300 ms, 500 ms, 750 ms, 1280 ms, 1920 ms, 2560 ms}

[BWP Allocation and Operation]

The type of BWP may be classified into initial BWP, active BWP, and default BWP. The active BWP and default BWP may be configured UE-specifically.

Figure 7:
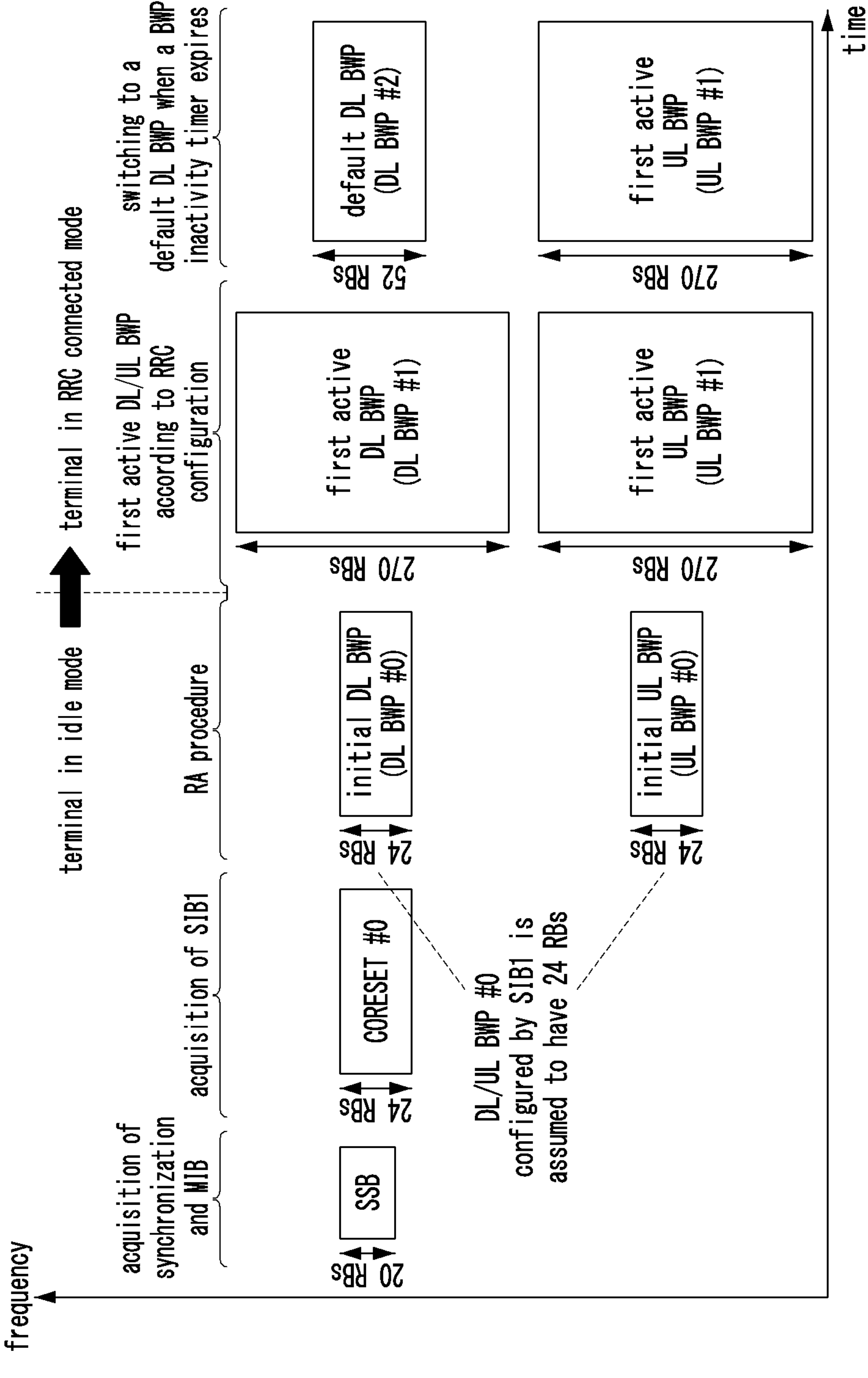
FIG. 7 is a conceptual diagram illustrating various exemplary embodiments of a BWP operation method according to an operation mode (e.g. operation state) of a terminal.

FIG. 7 is a conceptual diagram illustrating a first exemplary embodiment of a BWP operation method according to an operation mode (e.g. operation state) of a terminal.

As shown in FIG. 7, an operation mode of a terminal may be classified into idle mode, inactive mode, and RRC connected mode. A terminal in the idle mode may operate in initial BWPs (e.g. initial DL BWP, initial UL BWP). A terminal in the RRC connected mode may operate in active BWPs (e.g. active DL BWP, active UL BWP) and/or default BWP (e.g. default DL BWP).

The BWP may be switched, and communication between the base station (e.g. satellite) and the terminal may be performed in the switched BWP. A BWP switching operation may be performed or indicated by methods below.

Switching scheme 1: dedicated RRC signaling

Switching scheme 2: DCI signaling (e.g. signaling of DCI format 0_1 (UL grant), signaling of DCI format 1_0 (DL scheduling))

Switching scheme 3: BWP inactivity timer (bwp-InactivityTimer) included in the serving cell configuration information (ServingCellConfig)

Switching scheme 4: MAC CE

[Change in Characteristics According to Satellite Movement in NTN]

In NTN, a movement of a satellite according to its orbit and altitude may be predictable. Various information (e.g. elevation angle) on the satellite may be obtained based on the predicted movement of the satellite. The satellite's channel characteristics may be predictable, and BWP switching may be configured based on the predicted channel characteristics.

Figure 8A:
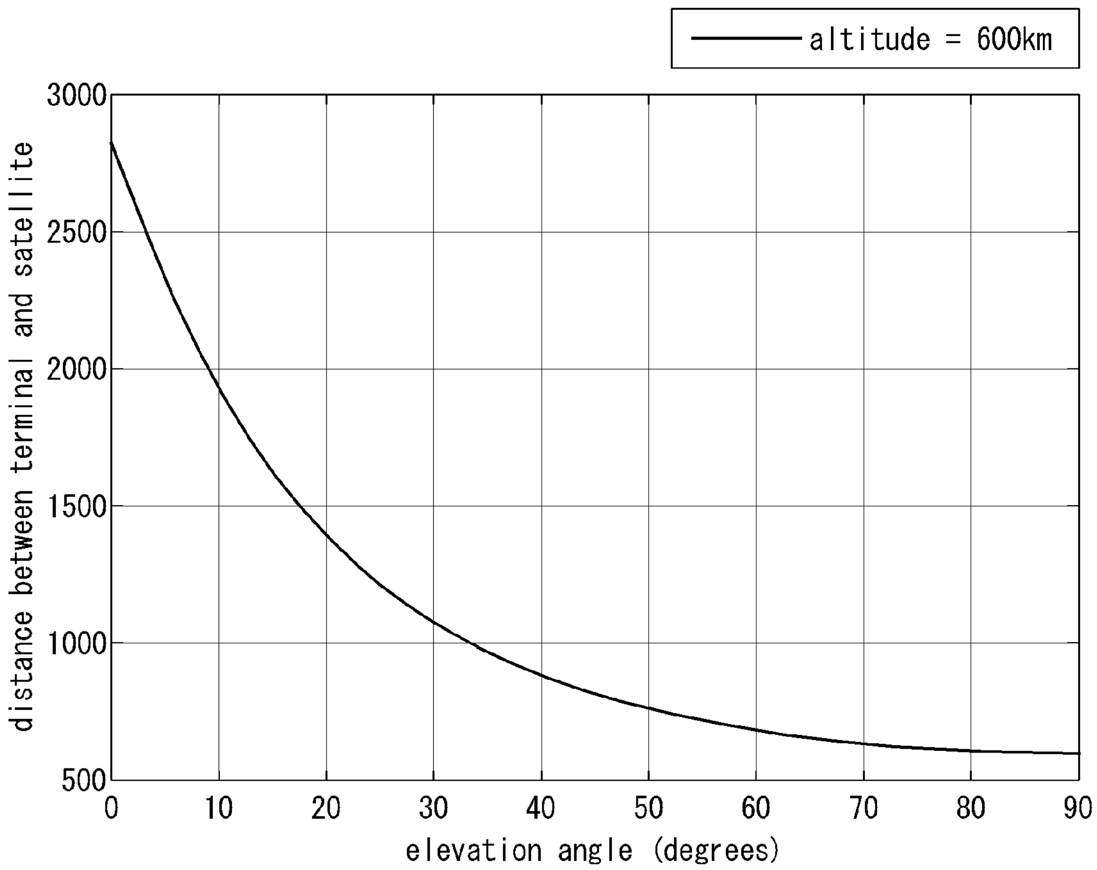
FIG. 8A is a graph illustrating a distance between a satellite and a terminal according to an elevation angle of the satellite.

FIG. 8A is a graph illustrating a distance between a satellite and a terminal according to an elevation angle of the satellite.

As shown in FIG. 8A, as the elevation angle of the satellite increases, the distance between the satellite and the terminal may decrease.

Figure 8B:
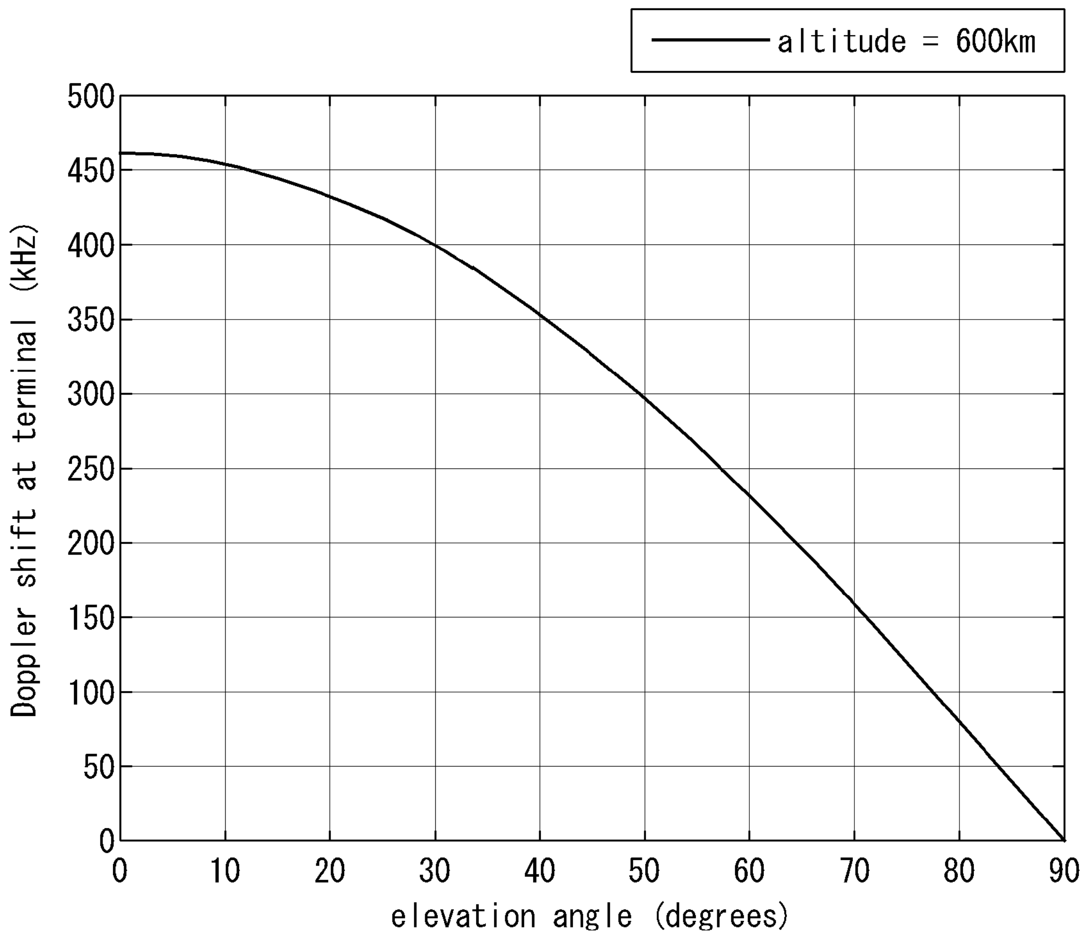
FIG. 8B is a graph illustrating a Doppler shift at a terminal according to an elevation angle of a satellite.

FIG. 8B is a graph illustrating a Doppler shift at a terminal according to an elevation angle of a satellite.

As shown in FIG. 8B, as the elevation angle of the satellite increases, the Doppler shift at the terminal may decrease.

[Proposed Technique 1: BWP Switching Configuration Method and BWP Switching Configuration Indication Method in EFB NTN]

In NTN, a satellite's beam may have earth moving beam (EMB) characteristics or earth fixed beam (EFB) characteristics. An NTN including a satellite with EMB characteristics may be referred to as an EMB NTN, and an NTN including a satellite with EFB characteristics may be referred to as an EFB NTN. In EFB NTN, a movement of the satellite may be predictable. A communication node may know in advance a distance, elevation angle, altitude, channel characteristics, and/or service environment (e.g. downtown, outskirts) between the satellite and a terminal according to the movement of the satellite. BWP switching may be configured in advance based on the above-described information, and BWP switching configuration (e.g. BWP switching configuration information) may be signaled to communication node(s). For example, the satellite (e.g. base station) may generate BWP switching configuration information and signal it to terminal(s), and the terminal(s) may perform BWP switching based on the BWP switching configuration information, and perform communication with satellites in a switched BWP. In addition, the satellite may perform BWP switching based on the BWP switching configuration information and perform communication with terminal(s) in the switched BWP. According to the above-described operation, signaling overhead for BWP switching may be reduced.

Figure 9:
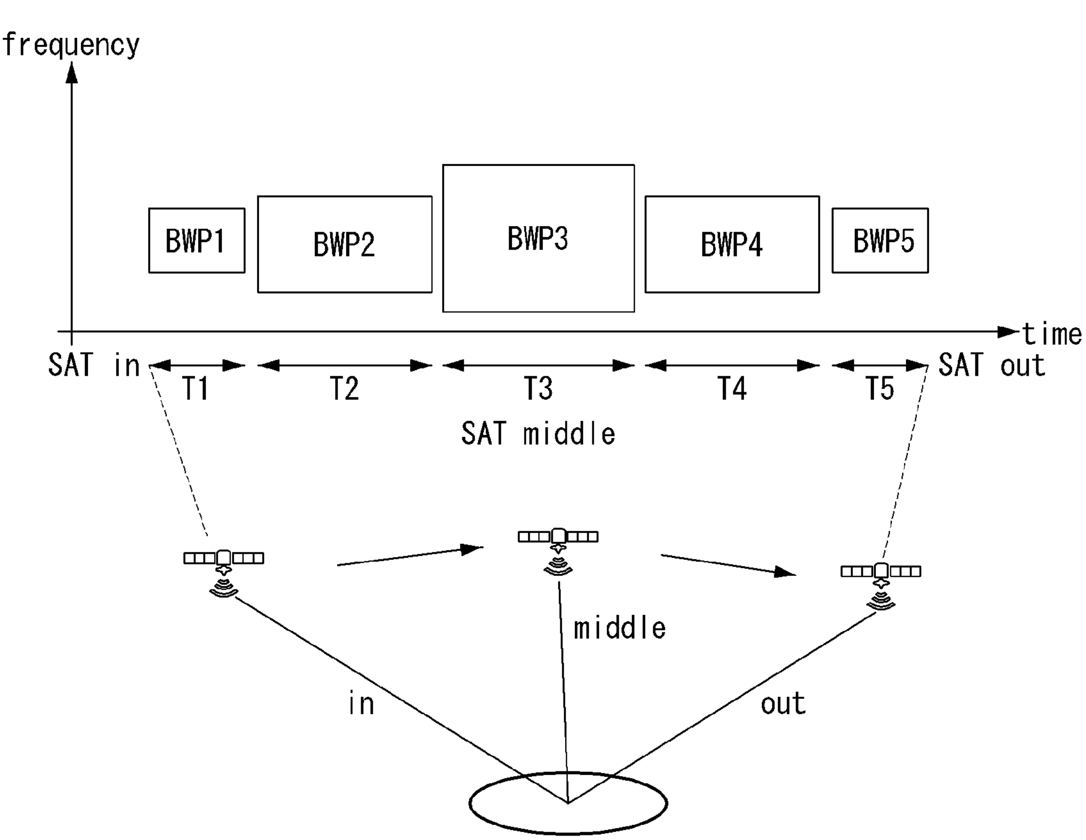
FIG. 9 is a conceptual diagram illustrating various exemplary embodiments of a BWP switching method in EFB NTN.

FIG. 9 is a conceptual diagram illustrating a first exemplary embodiment of a BWP switching method in EFB NTN.

As shown in FIG. 9, in a fixed cell on the ground, a BWP may be switched according to a movement of a satellite. For example, a BWP1, BWP2, BWP3, BWP4, and BWP5 may be configured, and a BWP may be switched according to the movement of the satellite. BWP1 may be referred to as B1, BWP2 may be referred to as B2, BWP3 may be referred to as B3, BWP4 may be referred to as B4, and BWP5 may be referred to as B5. A start time of T1 may mean a time at which the satellite enters the fixed cell, and an end time of T5 may mean a time at which the satellite leaves the fixed cell.

BWP switching configuration information may include a BWP switching configuration table. In addition, the BWP switching configuration information may further include an index (e.g. BWP switching configuration index) indicating specific information within the BWP switching configuration table. The BWP switching configuration table may be configured as shown in Table 4 below.

TABLE 4

| Index | BWP switching combination | Time |
|---|---|---|
| 1 | B1-B2-B3 | T1-T2-T3 |
| 2 | B1-B2-B3 | T11-T21-T31 |
| 3 | B2-B4-B5 | T2-T4-T5 |
| | . . . | |
| 9 | B3-B4-B5 | T3-T4-T5 |
| 10 | B1-B2-B3-B4 | T1-T2-T3-T4 |
| 11 | B1-B3-B4-B7 | T1-T3-T4-T7 |
| | . . . | |
| 19 | B2-B5-B6-B3 | T2-T5-T6-T3 |
| 20 | B1-B2-B3-B4-B5 | T1-T2-T3-T4-T5 |
| | . . . | |
| N | | |

The BWP switching configuration table may include one or more entries, and each entry may be comprised of an index, BWP switching combination, and time. In the BWP switching configuration table, one index may indicate a BWP switching combination and a time. The BWP switching combination may indicate a switching order of multiple BWPs. The time may indicate a time during which communication is performed in each BWP according to the BWP switching combination. In other words, the time may mean a usage time of each BWP according to the BWP switching combination. For example, if the index 1 in the BWP switching configuration table is indicated, BWPs may be switched in an order of B1-B2-B3, communication in B1 may be performed during T1, communication in B2 may be performed during T2, and communication in B3 may be performed during T3.

Since a Doppler effect is large in a boundary region of the satellite (e.g. cell boundary region), it may be preferable for a BWP with a large SCS to be configured in the cell boundary region. Therefore, a BWP with a wide bandwidth may be configured in the cell boundary region. Depending on constellation and/or operation of satellites, the number of BWPs in a BWP switching combination may vary. For example, when a large number of satellites are operated, a time during which one satellite provides a communication service may be relatively small. Therefore, the number of BWPs in a BWP switching combination may be small.

The BWP switching configuration table and the index may be transmitted using one signaling message or different signaling messages. For example, the BWP switching configuration table and the index may be transmitted using a higher layer signaling message (e.g. system information, RRC signaling message). Alternatively, the BWP switching configuration table may be transmitted using a higher layer signaling message, and the index may be transmitted using another higher layer signaling message, MAC signaling message (e.g. MAC CE), or PHY signaling message (e.g. DCI). Alternatively, the BWP switching configuration table may be preconfigured in communication nodes (i.e. the BWP switching configuration table may be predefined in the technical specifications), and only the index may be signaled to the communication nodes.

Serving cell configuration information (ServingCellConfig) may include the BWP switching configuration information (e.g. BWP switching configuration table). For example, the serving cell configuration information may include the BWP switching configuration table indicating BWP switching combinations available in the corresponding cell. The BWP switching configuration table may include index(ies) (e.g. BWP switching configuration index(ies)), BWP switching combinations, and time information. The BWP switching configuration table included in the serving cell configuration information may be all or part of Table 4. The BWP switching configuration information and BWP configuration information (e.g. BWP-Downlink, BWP-Uplink) may be transmitted through the same signaling message. Alternatively, the BWP switching configuration information and BWP configuration information may be transmitted through different signaling messages.

The terminal may receive the BWP switching configuration information from the satellite, perform a BWP switching operation based on the BWP switching configuration information, and perform communication with the satellite in a BWP switched by the BWP switching operation. In addition, the satellite may perform a BWP switching operation based on the BWP switching configuration information indicated to the terminal, and may perform communication with the terminal in the BWP switched by the BWP switching operation.

[Proposed Technique 2: Method of Operating a BWP Switching Time when Using BWP Switching Configuration Information According to Proposed Technique 1]

Method 1: BWP switching configuration information may include information on a start time of BWP switching. For example, a satellite (e.g. base station) may transmit a DCI including information on the start time of BWP switching to a terminal. The information on the start time of BWP switching may be indicated as an offset (e.g. slot offset) from a slot where the DCI is received to a start time of a BWP switching operation (e.g. a slot in which the BWP switching operation is performed). Alternatively, the start time of the BWP switching operation may be preconfigured in communication node(s). That is, the start time of the BWP switching operation may be predefined in the technical specifications.

Method 2: When BWP switching configuration information is used (e.g. when BWP switching is configured), information on a time during which a current BWP is used until being switched to a next BWP may be required. For example, if a BWP switching combination of B1-B2-B3 is indicated, the BWP may be switched from B1 to B2 after communication is performed in B1 during T1, and the BWP may be switched from B2 to B3 after communication is performed in B2 during T2. T1 and T2 may be set to different times. To reduce complexity, a time during which communication is performed in each of the BWPs may be set to the same time. For example, T1 and T2 may be set to the same time.

Method 3: Even when BWP switching is configured, the terminal may not operate according to BWP switching configuration depending on a specific situation (e.g. remaining battery level, channel state). That is, the terminal may not perform BWP switching. In the instant case, the BWP switching configuration may be overridden. A request to override the BWP switching configuration may trigger DCI-based BWP switching.

If BWP switching according to signaling (e.g. DCI) is not configured, it may be a default operation for the communication node to periodically perform BWP switching. If BWP switching according to signaling (e.g. DCI) is configured, the communication node may perform BWP switching at a time indicated by the signaling (e.g. DCI).

After BWP switching, the following operations may be performed. After a preset time elapses, the BWP switching operation may be resumed. In the instant case, a BWP switching configuration index (i.e. index in Table 4) may be signaled. For example, the communication node may switch the BWP to B4 instead of B2 according to the BWP switching configuration index 1 while performing communication in B1, and then perform communication in B4. A time during which communication is performed in B4 may be T4. If $T4<T2$, the communication node may switch the BWP from B4 to B2 after T4 elapses, and then perform communication in B2. A time during which communication is possible in B2 may be $T2-T4$. If $T2<T4<T2+T3$, the communication node may switch the BWP from B4 to B3 after T4 elapses, and then perform communication in B3. A time during which communication is possible in B3 may be $T2+T3-T4$.

BWP switching configuration information indicated by signaling may not be used. In the instant case, if BWP switching is required, BWP switching may be indicated by a DCI.

[Proposed Technique 3: Method of Confirming BWP Switching]

The same operating BWP may be applied to a satellite (e.g. base station) and a terminal. The operating BWP may refer to a BWP where communication is currently performed. A procedure for ensuring that the same BWP is configured/indicated may be introduced. DCI-acknowledgement (ACK) transmission may be utilized in the procedure of confirming BWP switching.

Method 1: When BWP switching is configured (e.g. when BWP switching configuration information is indicated), a communication node (e.g. satellite and/or terminal) may transmit a BWP switching ACK. The BWP switching ACK may indicate that the BWP switching configuration information is confirmed (e.g. received). For example, the BWP switching ACK may be transmitted when a usage time of the current BWP (e.g. operating BWP) expires. If the operating BWPs of the satellite and the terminal are inconsistent, [Proposed Technique 6: Method of responding to a BWP switching failure] described later may be applied.

Method 2: Earlier ACK scheme may be used. Since a transmission delay between the satellite and the terminal in NTN is long, a communication node may transmit a BWP switching ACK before expiration of a timer (e.g. BWP inactivity timer). If the transmission delay between the satellite and the terminal is υ, the communication node may transmit the BWP switching ACK before υ from an expiration time of the timer. According to the above-described operation, a problem of receiving a BWP switching ACK after a propagation delay between the satellite and the terminal from the expiration time of the timer may be solved.

[Proposed Technique 4: Method of Configuring a BWP Switching Combination]

A BWP switching operation may be performed according to movement of a satellite from one boundary of a cell to the other boundary of the cell. Depending on operations of NTN, communication services by the satellite may be initiated from an arbitrary region within the cell, not at the cell boundary. For example, in the exemplary embodiment of FIG. 9, the satellite's communication service may start in B3, and the BWP switching operation may be performed in an order of B3-B4-B5. In the instant case, the BWP switching combination may be configured based on methods below.

Method 1: Different BWP switching combinations may be configured for each case. This method may mean that a separate combination including the combination of B3-B4-B5 is configured. In the instant case, the size of the BWP switching configuration table may increase. In the above-described situation, both the indices 9 and 20 of Table 4 may be indicated.

Method 2: The existing BWP switching combination and an offset (e.g. BWP offset) may be used. The offset may be delivered to the terminal through signaling. The offset may be an offset between a starting BWP and a BWP where a communication service starts in the BWP switching combination. For example, the index 20 and offset 3 in Table 4 may be indicated. This may mean that the communication service starts in B3, the third BWP among B1-B2-B3-B4-B5 according to the index 20. According to Method 2, the size of the BWP switching configuration table does not increase, but additional signaling for the offset may be required.

If the satellite's communication service starts in B3, the communication service may not be provided to B3 during T3. The above-described situation may occur when the communication service starts at an arbitrary time other than a start time of T3. In the instant case, information on a time during which the first BWP is maintained (e.g. information on a provision time of the communication service in the first BWP) may be required. The information on the time during which the first BWP is maintained may be indicated by an offset. Alternatively, $T_{first}$, which is the time during which the first BWP is maintained, may be additionally indicated.

[Proposed Technique 5: Method of Delivering BWP Switching Configuration Information in a Handover Procedure]

In a handover procedure, a source cell may transmit, to a target cell, BWP switching configuration information indicated to a terminal. The target cell may receive the BWP switching configuration information of the source cell, and generate BWP switching configuration information for the target cell by considering the BWP switching configuration information of the source cell.

Figure 10:
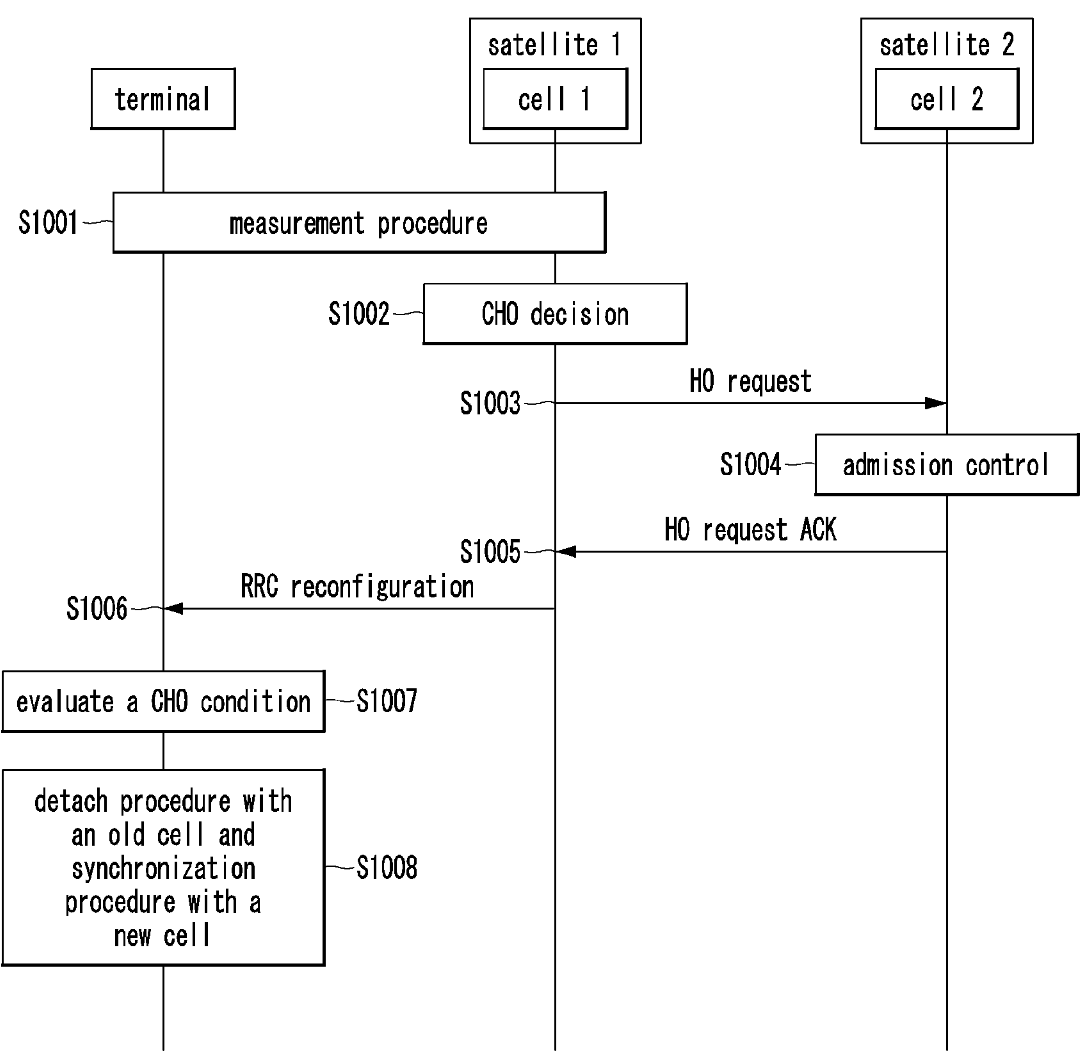
FIG. 10 is a sequence chart illustrating various exemplary embodiments of a handover procedure.

FIG. 10 is a sequence chart illustrating a first exemplary embodiment of a handover procedure.

As shown in FIG. 10, the handover procedure may be a conditional handover (CHO) procedure. A satellite 1 and a satellite 2 may be the same satellite. Alternatively, the satellite 1 and satellite 2 may be different satellites. A cell 1 may be a source cell, and a cell 2 may be a target cell. A measurement procedure may be performed between the terminal and the cell 1 (S1001). For example, the cell 1 may transmit measurement configuration information to the terminal. The terminal may perform a measurement operation based on the measurement configuration information indicated by the cell 1 and transmit a measurement result to the cell 1. The cell 1 may decide whether to perform a handover procedure (e.g. CHO procedure) based on the measurement result of the terminal (S1002).

If it is determined that a handover procedure is to be performed, the cell 1 may transmit a handover (HO) request message to the cell 2 (S1003). The HO request message may include BWP switching configuration information indicated by the cell 1 to the terminal, BWP switching combination indicated by the cell 1 to the terminal, or information on a current BWP (e.g. operating BWP) between the terminal and the cell 1. The cell 2 may receive the HO request message from the cell 1 and identify the information included in the HO request message. The cell 2 may decide whether to approve the handover request (S1004, 'admission control'). If the handover request is approved, the cell 2 may generate BWP switching configuration information (e.g. BWP switching combination) for the cell 2 by considering the BWP switching configuration information of the cell 1.

The cell 2 may transmit an HO request ACK including the BWP switching configuration information (e.g. BWP switching combination) to the cell 1 (S1005). The cell 1 may receive the HO request ACK from the cell 2. When the HO request ACK is received, the cell 1 may determine that the HO request is approved by the cell 2. The cell 1 may generate an RRC reconfiguration message and transmit the RRC reconfiguration message to the terminal (S1006). The RRC reconfiguration message may include the BWP switching configuration information of the cell 2.

The terminal may receive the RRC reconfiguration message from the cell 1 and identify the information included in the RRC reconfiguration message (e.g. BWP switching configuration information of the cell 2). The terminal may evaluate a CHO condition and execute CHO if the CHO condition is satisfied (S1007). In the instant case, the terminal may perform a detach procedure with the cell 1, which is an old cell, and a synchronization procedure with the cell 2, which is a new cell (S1008). When the terminal is connected to the cell 2, the terminal may perform communication with the cell 2. In the instant case, the terminal may perform a BWP switching operation based on the BWP switching configuration information included in the RRC reconfiguration message received in the step S1006.

Meanwhile, referring to Table 4 above, the BWP switching combination (i.e., B1-B2-B3) indicated by the index 1 may be a portion of the BWP switching combination (i.e. B1-B2-B3-B4-B5) indicated by the index 20. A case where the BWP switching combination according to the index 1 is used may correspond to a case where a handover procedure is performed in a region other than a cell boundary. The BWP switching operation based on the BWP switching configuration information of the current cell may be stopped, and BWP switching configuration information for a new cell may be obtained. According to [Proposed Technique 5], the BWP switching configuration information for the target cell (i.e., cell 2) may be provided to the terminal in the handover procedure.

The BWP switching configuration information may indicate an index of the first BWP where communication between the terminal and the new cell is performed after completion of the handover procedure. In addition, a usage time of the first BWP (e.g. a time during which communication between the terminal and the new cell is performed in the first BWP) may be additionally calculated, and information on the usage time of the first BWP may be signaled to the terminal. Similarly to the description on [Proposed Technique 4], the usage time of the first BWP may differ from a preset time depending on a handover timing, and this the information on the usage time of the first BWP may be signaled to the terminal.

[Proposed Technique 6: Method of Responding to a BWP Switching Failure]

Inconsistency in BWPs (e.g. operating BWPs) of the terminal and the satellite (e.g. base station) may occur in the following situations. The inconsistency in BWPs (i.e. BWP mismatch) may mean that the operating BWP of the terminal is different from the operating BWP of the satellite.

When the BWP switching ACK according to [Proposed Technique 3] is not received within a preset time When transmission/reception errors occur continuously If a BWP mismatch occurs between the terminal and the satellite, method for responding to the BWP mismatch may be as follows.

- Method 1: The satellite and/or terminal may switch the current BWP (e.g. operating BWP) to a default BWP after a preset time.
- Method 2: The satellite and/or terminal may switch the current BWP (e.g. operating BWP) to a previous BWP after a preset time.

[Proposed Technique 7: Method for a Terminal to Provide Side Information to a Satellite (e.g. Base Station) in a Random Access (RA) Procedure]

To help a satellite (e.g. base station) select an optimal BWP switching combination, a terminal may provide side information (e.g. additional information) to the satellite in an RA procedure. The satellite may generate BWP switching configuration information by considering the side information of the terminal. The side information may include a location and/or elevation angle of the terminal.

Figure 11:
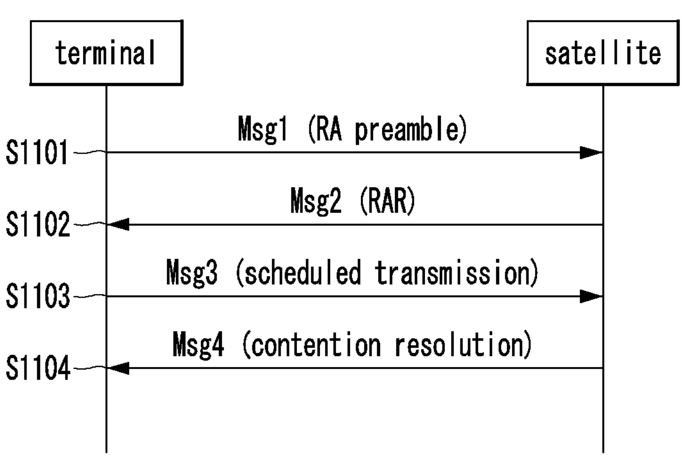
FIG. 11 is a sequence chart illustrating various exemplary embodiments of a four-step RA procedure.

FIG. 11 is a sequence chart illustrating a first exemplary embodiment of a four-step RA procedure.

As shown in FIG. 11, a terminal may transmit a Msg1 (i.e. RA preamble) to a satellite (S1101). When the Msg1 is received from the terminal, the satellite may transmit a Msg2 (i.e. random access response (RAR)) to the terminal (S1102). When the Msg2 is received from the satellite, the terminal may transmit a Msg3 including side information (e.g. location and/or elevation angle of the terminal) to the satellite (S1103). When the Msg3 is received from the terminal, the satellite may transmit a Msg4 to the terminal (S1104). The satellite may generate BWP switching configuration information based on the side information received from the terminal.

Figure 12:
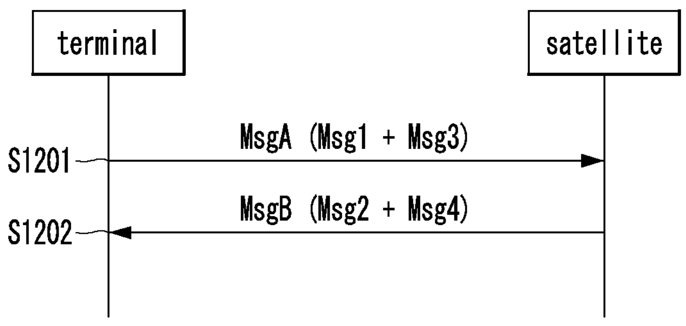
FIG. 12 is a sequence chart illustrating various exemplary embodiments of a two-step RA procedure.

FIG. 12 is a sequence chart illustrating a first exemplary embodiment of a two-step RA procedure.

As shown in FIG. 12, a terminal may transmit a MsgA (i.e. RA preamble+data) to a satellite (S1201). The MsgA may include side information (e.g. location and/or elevation angle of the terminal). When the MsgA is received from the terminal, the satellite may transmit a MsgB (e.g. RAR) to the terminal (S1202). The satellite may generate BWP switching configuration information based on the side information received from the terminal.

[Proposed Technique 8: Method for a Terminal to Provide Auxiliary Information to a Satellite (e.g. Base Station) after Completion of an RA Procedure]

To help a satellite (e.g. base station) select an optimal BWP switching combination, a terminal may transmit side information (e.g. additional information) to the satellite after completion of an RA procedure. The side information may include a location and/or elevation angle of the terminal. The side information may be transmitted to the satellite through RRC signaling. The side information may be transmitted through an RRC setup complete (RRCSetupComplete) message and/or UE assistance information (UEAssistanceInfo). In addition, a new RRC signaling message for transmission of the side information may be defined, and the terminal may transmit the new RRC signaling message including the side information to the satellite.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments of the present disclosure, a programmable logic device such as a field-programmable gate array may be used to perform some or all of functions of the methods described herein. In some exemplary embodiments of the present disclosure, the field-programmable gate array may be operated with a microprocessor to perform one of the methods described herein. In general, the methods are preferably performed by a certain hardware device.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of a terminal, the method comprising:
receiving bandwidth part (BWP) switching configuration information from a satellite, the BWP switching configuration information indicating a BWP switching combination, the BWP switching combination indicating BWPs among multiple BWPs configured for the terminal and a switching order among the BWPs, wherein the BWP switching configuration information includes a BWP switching configuration table, each entry of the BWP switching configuration table includes an index, the BWP switching combination, and a time, and the time indicates a usage time of a BWP according to the switching order;
performing a BWP switching operation according to the switching order; and performing communication with the satellite in a BWP switched according to the BWP switching operation.

2. The method of claim 1, wherein the BWP switching configuration information further includes a specific index indicating a specific entry in the BWP switching configuration table.

3. The method of claim 2, wherein the BWP switching configuration table is received from the satellite through a first signaling message, and the specific index is received from the satellite through a second signaling message.

4. The method of claim 1, further including:
receiving, from the satellite, start time information of the BWP switching operation,
wherein the BWP switching operation starts at a time indicated by the start time information.

5. The method of claim 4, wherein the start time information is a slot offset between a slot where the start time information is received and a slot where the BWP switching operation starts.

6. The method of claim 1, further including:
transmitting, to the satellite, acknowledgement (ACK) indicating that the BWP switching configuration information is confirmed.

7. The method of claim 1, further including:
receiving a BWP offset from the satellite, wherein the BWP switching operation is performed for a BWP after the BWP offset from a first BWP according to the switching order.

8. The method of claim 1, wherein the BWP switching configuration information is received in a handover procedure for the satellite.

9. The method of claim 1, further including:
in response that a first operating BWP of the terminal is different from a second operating BWP of the satellite, switching the first operating BWP to a default BWP or previous BWP.

10. The method of claim 1, further including:
transmitting, to the satellite, auxiliary information considered for generating the BWP switching configuration information, wherein the auxiliary information is transmitted in a random access (RA) procedure between the terminal and the satellite, or transmitted after completion of the RA procedure.

11. A method of a satellite, the method comprising:
generating bandwidth part (BWP) switching configuration information indicating a BWP switching combination, the BWP switching combination indicating BWPs among multiple BWPs configured for the satellite and a switching order of the BWPs, wherein the BWP switching configuration information includes a BWP switching configuration table, each entry of the BWP switching configuration table includes an index, the BWP switching combination, and a time, and the time indicates a usage time of a BWP according to the switching order;
transmitting the BWP switching configuration information to a terminal;
performing a BWP switching operation according to the switching order; and
performing communication with the terminal in a BWP switched according to the BWP switching operation.

12. The method of claim 11, wherein the BWP switching configuration information further includes a specific index indicating a specific entry in the BWP switching configuration table.

13. The method of claim 12, wherein the BWP switching configuration table is transmitted to the terminal through a first signaling message, and the specific index is transmitted to the terminal through a second signaling message.

14. The method of claim 11, further including: transmitting, to the terminal, start time information of the BWP switching operation, wherein the BWP switching operation starts at a time indicated by the start time information.

15. The method of claim 14, wherein the start time information is a slot offset between a slot where the start time information is received and a slot where the BWP switching operation starts.

16. The method of claim 11, further including:
transmitting a BWP offset to the terminal, wherein the BWP switching operation is performed for a BWP after the BWP offset from a first BWP according to the switching order.

17. The method of claim 11, further including:
in response that a first operating BWP of the terminal is different from a second operating BWP of the satellite, switching the second operating BWP to a default BWP or previous BWP.

18. The method of claim 11, further including:
receiving, from the terminal, auxiliary information considered for generating the BWP switching configuration information,
wherein the auxiliary information is received in a random access (RA) procedure between the terminal and the satellite, or received after completion of the RA procedure.

* * * * *